(12) United States Patent
Su et al.

(10) Patent No.: US 10,230,602 B2
(45) Date of Patent: Mar. 12, 2019

(54) ENDPOINT WEB MONITORING SYSTEM AND METHOD FOR MEASURING POPULARITY OF A SERVICE OR APPLICATION ON A WEB SERVER

(75) Inventors: Ao-Jan Su, Long Island, NY (US); Aleksandar Kuzmanovic, Evanston, IL (US)

(73) Assignee: Northwestern University, Evanston, IL (US)

( * ) Notice: Subject to any disclaimer, the term of this patent is extended or adjusted under 35 U.S.C. 154(b) by 71 days.

(21) Appl. No.: 13/295,383

(22) Filed: Nov. 14, 2011

(65) Prior Publication Data
US 2012/0151068 A1    Jun. 14, 2012

Related U.S. Application Data

(60) Provisional application No. 61/421,365, filed on Dec. 9, 2010.

(51) Int. Cl.
*H04L 12/917* (2013.01)
*H04L 12/26* (2006.01)

(52) U.S. Cl.
CPC .......... *H04L 43/0852* (2013.01); *H04L 43/10* (2013.01)

(58) Field of Classification Search
CPC ....... H04L 43/10; H04L 69/16; H04L 69/143; H04L 67/1025; H04L 69/163; H04L 67/02; H04L 67/1029; H04L 67/1008; H04L 69/28; H04L 41/5035; H04L 41/5038; H04L 67/1004; H04L 67/30; H04L 67/325; H04L 43/0864; H04L 12/2697; H04L 43/50; H04L 41/147; H04L 43/12;
(Continued)

(56) References Cited

U.S. PATENT DOCUMENTS 6,584,504 B1 *  6/2003  Choe ........................... 709/224
6,697,964 B1 *  2/2004  Dodrill ............... G06F 11/3414
                                              709/200
(Continued)

OTHER PUBLICATIONS

International Search Report and Written Opinion for PCT/US11/60548 dated Apr. 24, 2012.
(Continued)

*Primary Examiner* — Oscar A Louie
*Assistant Examiner* — Linh T. Nguyen
(74) *Attorney, Agent, or Firm* — Benesch, Friedlander, Coplan & Aronoff LLP

(57) ABSTRACT

A system is provided that includes an artificial connection generator and a probe machine. The artificial connection generator is configured to establish one or more artificial connections with a server that at least partially hosts one or more services or applications for access by clients. The probe machine is configured to control a number of artificial connections with the server by the artificial connection generator. The probe machine also is configured to establish a probing connection with a server to determine a service time of the server that is indicative of a time period involved with execution by the server of one or more requests to the server. The probe machine is configured to derive a number of actual connections between the clients and the server based on changes in the service time of the server when the number of artificial connections with the server is varied.

24 Claims, 5 Drawing Sheets

(58) Field of Classification Search
CPC . H04L 67/14; H04L 41/5003; H04L 43/0811;
H04L 43/0876; H04L 43/08; G06F
17/30289; G06F 17/30463; G06F
17/30466; G06F 17/30545; G06F 9/505;
G06F 11/3419; G06F 11/3457; G06F
17/5009; G06F 2209/508; G06F 2201/87;
G06F 11/3409; G06F 11/3433; G06F
11/3452; G06F 11/3466; G06F 2201/81;
G06F 2201/815; G06F 2201/88; G06F
11/3414; G06F 11/30; G06F 11/3672
USPC ....... 709/204, 217, 219, 227–229, 203, 224,
709/232, 218, 223, 238; 370/252;
702/121, 179, 182; 714/E11.195, 47.2
See application file for complete search history.

(56) References Cited

U.S. PATENT DOCUMENTS

| | | | | |
|---|---|---|---|---|
| 6,823,380 | B1* | 11/2004 | Nace | H04L 41/145 709/203 |
| 7,146,416 | B1* | 12/2006 | Yoo et al. | 709/224 |
| 7,630,862 | B2* | 12/2009 | Glas | G06F 11/3414 702/119 |
| 7,657,401 | B2* | 2/2010 | Dawson | G06F 11/3414 702/186 |
| 7,720,955 | B1 | 5/2010 | Kelly et al. | |
| 8,302,100 | B2* | 10/2012 | Deng et al. | G06F 15/16 718/104 |
| 8,799,502 | B2* | 8/2014 | Raphel | H04L 47/10 709/232 |
| 2001/0053129 | A1* | 12/2001 | Arsikere et al. | 370/250 |
| 2002/0042828 | A1 | 4/2002 | Peiffer | |
| 2002/0161553 | A1* | 6/2002 | Har'El et al. | G06F 15/00 702/186 |
| 2002/0091506 | A1* | 7/2002 | Gruber | 703/19 |
| 2002/0116491 | A1* | 8/2002 | Boyd et al. | 709/224 |
| 2002/0177977 | A1* | 11/2002 | Scarlat et al. | 702/186 |
| 2003/0023743 | A1* | 1/2003 | Raphel et al. | 709/232 |
| 2003/0069957 | A1* | 4/2003 | Malmskog et al. | 709/223 |
| 2003/0074161 | A1* | 4/2003 | Smocha | G06F 11/3409 702/186 |
| 2003/0074606 | A1* | 4/2003 | Boker | 714/42 |
| 2003/0216890 | A1* | 11/2003 | Gross et al. | 702/186 |
| 2004/0236757 | A1* | 11/2004 | Caccavale | G06F 11/3409 |
| 2005/0055441 | A1* | 3/2005 | Nace | H04L 41/145 709/224 |
| 2005/0086335 | A1 | 4/2005 | Liu et al. | |
| 2006/0045019 | A1* | 3/2006 | Patzschke | H04L 12/2697 370/241 |
| 2007/0168494 | A1 | 7/2007 | Liu et al. | |
| 2007/0282567 | A1* | 12/2007 | Dawson | G06F 11/30 702/186 |
| 2008/0212488 | A1* | 9/2008 | Okada | H04L 12/2697 370/253 |
| 2010/0250732 | A1* | 9/2010 | Bucknell | H04L 41/5038 709/224 |
| 2011/0078108 | A1* | 3/2011 | Kumar | G06F 11/3495 707/602 |
| 2011/0246568 | A1* | 10/2011 | Morimoto | 709/203 |
| 2012/0016983 | A1* | 1/2012 | Ruiz et al. | 709/224 |

OTHER PUBLICATIONS

Akamai, http://www.akamai.com/.
Alexa.com. http://www.alexa.com/.
Avast! antivirus, http: //www. avast. com/index.
Avira antivirus, http://www.avira.com/en/pages/ index.php.
AWSats. http://awstats.sourceforge.net/.
Can you trust Alexa and Google Trends? http://www.markpack.org. uk/ can-you-trust-alexa-and-google-trends/.
Compuware Vantage. http://www.compuware.com/ solutions/vantage. asp.
comScore.com. http://www.comscore.com/.
Definition of web bug. http://www.pcmag.com/ encyclopedia.term/ O, 2542, t=Web+bug&i=54280, 00. asp.
Google analytics. http://www.google.com/ analytics/.
Google trends. http://trends.google.com/ websites.
Haproxy: The reliable, high performance tcp/http load balancer. http://haproxy.lwt.eu/.
How does load balancing work? http://www.cisco. com/en/US/tech/ tk365/technologies_tech.note09186a0080094820.shtml.
Measuring web traffic. http://www.ibm.com/ developerworks/web/ library/wa-mwtl/.
Ayani, R. Comparison of load balancing strategies on cluster-based web servers. *Simulation* 77, 5-6 (2001). 185-195.
Nielsen, comScore Stat Accuracy Questioned. http://www.betanews. com/article/ Nielsen-comScore-Stat-Accuracy- Questioned/ 1177365481.
Omniture.com. http://www.omniture.com/.
Rubis: Rice university bidding system, http://rubis.ow2. org/.
Tcp tuning, http://people.redhat.com/alikins/ system-tuning. html#tcp.
tcpdump. http://www.tcpdump.org.
Tealeaf CX. http://www.tealeaf.com/products/ ex. php.
Web-stat.com. http://www.web-stat.net/.
The webalizer. http://www.webalizer.org/.
Wireshark. http://www.wireshark.org.
Amza, C, CH, A, Cox, A. L. Elnikety, S., Gil, R., Raja-Mani, K., Cecchet, E., and Marguerite, J. Specification and implementation of dynamic web site benchmarks. In *IEEE WWC* (2002).
Anderson, T. E., Collins, A., Krishnamurthy, A., and Zahorjan, J. PCP: Efficient endpoint congestion control. In *USENIX NSD!* (2006).
Macia, G., Wang, Y., Rodriguez, R., and Kuzmanovic, A. ISP-enabled behavioral ad targeting without deep packet inspection. In *IEEEINFOCOM* (2010).
Mosberger, D., and Jin, T. httperf—a tool for measuring web server performance. *SIGMETRICS Performance Evaluation Review* 26,3 (1998), 31-37.
Roth, A.. and Ockenfels, A. Last-minute bidding and the rules for ending second-price auctions: Evidence from eBay and Amazon auctions on the Internet *American Economic Review* 92.4(2002), 1093-1103.
Steiglitz, K. *Snipers, shills, & sharks: eBay and human behavior*, Princeton University Press, 2007.
Urgaonkar. B., Pacifici, G., Shenoy, P.. Spreitzer, M., and Tantawi, A. An analytical model for multi-tier Internet services and its applications. In *ACM SIGMETRICS* (2005).
Urgaonkar, B., Pacifici, G., Shenoy, P. J. Spreitzer, M., and Tantawi, A. N. Analytic modeling of multitier internet applications. *TWEB I*, 1 (2007).
Veal, B., and Foong, A. Performance scalability of a multi-core web server. In *ACMANCS* (2007).
How does load balancing work? http://www.cisco.com/en/US/ tech/tk365/technologies_tech_ note09186a0080094820.shtml.
PlanetLab. http://www.planet-lab.org/.
Banga, G., and Druschbl, P. Measuring the capacity of a web server under realistic loads. *World Wide Web* 2, 1-2 (1999), 69-83.
Baryshnikov, Y., Cofpman, E, PiBrre, G,, Rubbnstein, D., Squillantb, M., and Yimwad-Sana, T. Predictability of web-server traffic congestion.*In IEEE WCW* (2005).
Bent, L, Koletsou, M., and Voelkbr, G. The Medusa proxy. Parallel connections under two browsers. http://www.sysnet.ucsd.edu/ medusa/.
Bourke, T. *Sewer load balancing*. O'Reilly Media, 2001.
Breslau, L., Knightly, E. W., Shenker, S., Sto-Ica, I., and Zhang, H. Endpoint admission control: Architectural issues and performance. *InACMSIG-COMM* (2000).
Choi, H.-K, and Limb, J. 0. A behavioral model of web traffic. In *IEEE ICNP* (1999).
Floyd, S., and Jacobson, V. On traffic phase effecis in packet-switched gateways. *Internetworking: Research and Experience* 3,3 (Sep. 1992), 115-156.

(56) References Cited

OTHER PUBLICATIONS

Gummadi, K, Madhyastha, H., Gribble, S., Levy, H., and Wetherall, D. Improving the reliability of Internet paths with one-hop source routing. In *USENIXOSDI* (2004).

Jung, J., Krishnamurthy, B., and Rabinovich, M. Flash Crowds and denial of service attacks: characterization and implications for CDNs and web sites. In *Wmv* (2002).

Kandula, S., Katabi, D., Jacob, M,, and Bbrger, A Botz-4-sale: Surviving organized DDoS attacks that mimic flash crowds, in *USENIXNSDI* (2005).

Li, Z., Zhano, M., Zhu, Z., Chen, Y., Greenberg, A. G., and Wang, Y.-M. Webprophet. Automating performance prediction for web services. In *USENIX NSDI* (2010).

Liu, Z,, Niclausse, N., and Jalpa-Villanueva, C Traffic model and performance evaluation of web servers. *Performance Evaluation* 46,2-3 (Oct. 2001), 77-100.

Urgaonkar, B., Pacifici, G,, Shbnoy, P., Spre-1tzbr, M., and Tantama, A. An Analytical model for multi-tier internet services and its applications. In *ACM SIGMETRICS* (2005).

\* cited by examiner

ENDPOINT WEB MONITORING SYSTEM AND METHOD FOR MEASURING POPULARITY OF A SERVICE OR APPLICATION ON A WEB SERVER

CROSS-REFERENCE TO RELATED APPLICATION

This application claims priority benefit from U.S. Provisional Application Ser. No. 61/421,365, which was filed on 9 Dec. 2010, and is titled "Endpoint Web Monitoring System And Method for Measuring Popularity Of A Service Or Application On A Web Server" (referred to herein as the "'365 Application"). The entire disclosure of the '365 Application is incorporated by reference herein.

BACKGROUND

Determining the popularity of a Web service or application can be an important question whose relevance continues to grow with increasing commercialization of the Internet. Knowing how many clients are accessing a Web server at any point in time can be a useful measure for a number of reasons. For example, in addition to helping with classical network or Web-server traffic engineering and capacity planning tasks, identifying the number of clients accessing a Web server also may reflect the popularity of a given service or application hosted at the Web server. A high popularity (or a lack of popularity) can directly affect the marketing potential of a given application or service. Given that online advertising has become an important factor in the business model of today's Internet, the measurement of a popularity of the service or application may directly impact the cost of advertisements at the service or application. The cost of advertisements at the service or application directly impacts revenues derived from the service or application.

Without having administrative access or privileges to server or network logs that track access to a service or application (and therefore, the popularity of the service or application), the independent auditing of a claim of a certain popularity of a service or application can be difficult. Some known systems (e.g., Alexa, comScore, Google Trends, and the like) rely on "crowd-sourcing" methods. Such crowd-sourcing methods attempt to indirectly measure the popularity of a service or application. For example, crowd-sourcing methods can estimate the popularity of a service or application by collecting browsing statistics of a subset of Internet users accessing or using the service or application.

Crowd-sourcing methods of measuring popularity of a service or application can involve a subset of Internet clients installing typically "free" toolbars or other software applications on the clients to collect user browsing statistics. The toolbars or other applications collect and report these statistics, which may be used to quantify the popularity of various services or applications. One problem with crowd-sourcing methods is that the measurement methods typically are not comprehensive as the methods rely only on a subset of end users. Consequently, such methods can provide popularity estimates with unknown error bounds. As a result, the accuracy of such crowd-sourcing methods has been called into question. Empirical measurements used to examine the accuracy of the crowd-sourcing methods have found that the crowd-sourcing methods can generate striking discrepancies relative to ground truth data and may have a fundamental inability to accurately estimate trends in the popularity of a service or application.

A need exists for the independent measurement or relatively accurate estimation of the popularity or traffic of a service or application hosted on a Web server without having administrative access or privileges to the Web server or server logs.

BRIEF DESCRIPTION

Reference will be made below in detail to example embodiments of the inventive subject matter, examples of which are illustrated in the accompanying drawings. Wherever possible, the same reference numerals used throughout the drawings refer to the same or like parts. Although example embodiments of the inventive subject matter are described with respect to Internet websites, embodiments also may be applicable for use with other applications or services that are hosted on one or more Web servers or other servers to which a popularity auditor may not have administrative access or privileges (or restricted access or privileges).

At least one embodiment described herein provides an End-point Web Monitor (EWM) system and method capable of measuring a Web server's popularity directly from an endpoint, such as from an entity at one end of a transport layer connection with the Web server. The capitalization of the term "Web" is not intended to limit the scope of embodiments of the subject matter described herein to a particular network, Internet, intranet, or the like. The terms "Web," "web," "network," "intranet," and "Internet" may be used interchangeably in accordance with one or more embodiments described herein. The term "server" is intended to encompass a single or multiple interconnected computing devices or processor operating as a cohesive whole to perform one or more operations or with one or more interconnected computing devices or processors operating independent of one or more other computing devices or processors. In one embodiment, the EWM system and method employs a combination of hypertext transfer protocol (HTTP) requests (such as HEAD or GET requests), transmission control protocol (TCP) pings, and a control mechanism to estimate a number of actual or active connections attached to a Web server. The estimated number of actual or active connections attached to the Web server may be referred to as a popularity index.

One or more technical effects of the embodiments described herein provides a system and method for providing relatively accurate measurements or estimates of popularity indices of a variety of applications or services running on a Web server without placing significant or non-negligible computational and bandwidth overhead on the monitored Web server. In one embodiment, the system and/or method may provide the relatively accurate measurements or estimates within a relatively short time period (referred to herein as a convergence time). As a result, one or more embodiments of the system and method may monitor popularity trends, or changes or trends in the popularity indices, over relatively short time scales or periods.

In another embodiment, an endpoint web monitoring (EWM) system is provided that includes a probe machine and an artificial connection generator. The probe machine is configured to transmit TCP ping probes and request probes to a Web server associated with a connection limitation parameter on a total number of connections with the Web server. The probe machine also is configured to monitor return trip times of the TCP ping probes and of the request probes. The artificial connection generator is configured to create artificial connections with the Web server. The probe machine is configured to monitor the return trip times to determine when a number of active connections and the artificial connections with the Web server approaches the connection limitation parameter. The active connections are representative of connections between Web clients and the Web server. The probe machine is configured to derive the number of active connections based on the number of artificial connections with the Web server.

In another embodiment, a method of monitoring a popularity of a service or application on a Web server from an endpoint is provided. The method includes transmitting TCP ping probes to the Web server to determine a network latency, transmitting request probes to the Web server to determine a service time of the Web server, changing a number of artificial connections to the Web server based on the service time, and determining a number of actual connections to the Web server based on the number of artificial connections and a connection limitation parameter of the Web server.

In another embodiment, a computer readable storage medium for an endpoint web monitoring (EWM) system having a processor is provided. The computer readable storage medium includes instructions that direct the processor to transmit ping probes (e.g., TCP ping probes as one example) to a Web server to determine a network latency, transmit request probes to the Web server to determine a service time of the Web server, change a number of artificial connections to the Web server based on the service time, and determine a number of actual connections to the Web server based on the number of artificial connections and a connection limitation parameter of the Web server.

In another embodiment, a system is provided that includes an artificial connection generator and a probe machine. The artificial connection generator is configured to establish one or more artificial connections with a server that at least partially hosts one or more services or applications for access by clients. The probe machine is configured to control a number of artificial connections with the server by the artificial connection generator. The probe machine also is configured to establish a probing connection with a server to determine a service time of the server that is indicative of a time period involved with execution by the server of one or more requests to the server. The probe machine is configured to derive a number of actual connections between the clients and the server based on changes in the service time of the server when the number of artificial connections with the server is varied.

In another embodiment, a method is provided that includes measuring services times for executing requests sent to a server, controlling a number of artificial connections with the server based on the service times, monitoring changes in the service times of the server based on changes in the number of artificial connections with the server, and deriving a number of actual connections with the server based on the changes in the service times. The actual connections represent connections with the server other than connections used to measure the service times or to establish the artificial connections with the server.

In another embodiment, a computer readable storage medium for a system having a controller is provided. The computer readable storage medium includes one or more sets of instructions that are configured to direct the controller to measure services times for executing requests sent to a server, control a number of artificial connections with the server based on the service times, monitor changes in the service times of the server based on changes in the number of artificial connections with the server, and derive a number of actual connections with the server based on the changes in the service times. The actual connections represent connections with the server other than connections used to measure the service times or to establish the artificial connections with the server.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
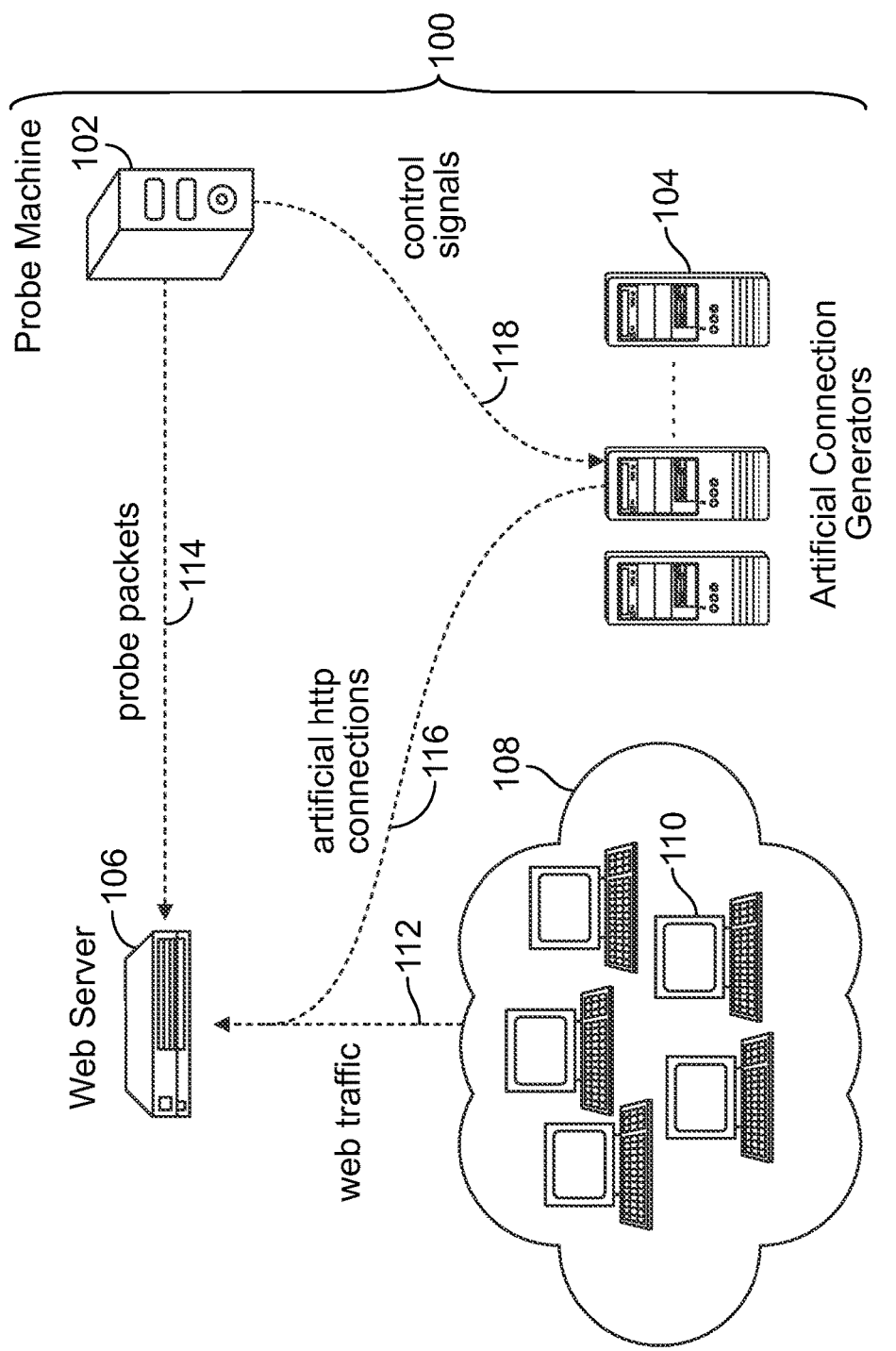
FIG. 1 is a block diagram of one embodiment of an Endpoint Web Monitoring (EWM) system.

FIG. 1 is a block diagram of one embodiment of an Endpoint Web Monitoring (EWM) system 100. The EWM system 100 includes a probe machine 102 and one or more artificial connection generators 104. While only a single probe machine 102 is shown in FIG. 1, alternatively the EWM system 100 may have a greater number of probe machines 102. Additionally, while three artificial connection generators 104 are shown, alternatively the EWM system 100 may have a smaller or larger number of the artificial connection generators 104. The EWM system 100 is communicatively coupled with a server 106 (referred to herein as "Web server") that hosts or provides access to one or more services and/or application through a network 108. Each of the Web server 106, the probe machine 102, and/or the artificial connection generators 104 may include or represent one or more computing devices, such as one or more computers, servers, routers, or other electronic machines, that can include processors, controllers, and the like, to carry out one or more operations. Alternatively, one or more of the Web server 106, the probe machine 102, and/or the artificial connection generators 104 may include or represent modules, such as computer software systems provided as one or more sets of instructions stored on a tangible and non-transitory (e.g., not a transient signal) computer readable medium that direct one or more computing devices to perform various operations described herein.

A service and/or application that is hosted by one or more Web servers 106 may include a variety of software systems, such as software systems that support interoperable machine-to-machine interaction over or through the network 108, software systems that are accessed over or through the network 108, software systems hosted in a browser-controller environment or coded in a browser-supported language, and the like. Examples of such services and/or applications include web browsers, software applications available on the Internet, and the like.

Several clients 110 (referred to herein as "Web clients"), such as computers, processors, controllers, software systems (e.g., software applications), and the like, of third party users seeking to access the services and/or applications hosted by the Web server 106, are communicatively coupled with the Web server 106 through or via one or more actual connections that extend through or are included in the network 108. The Web clients 110 are shown in the network 108 as the Web clients 110 may be communicatively coupled with the network 108. The network 108 represents one or more interconnected computer networks, such as the Internet, intranets, other local area networks (LAN), other wide area networks (WAN), and the like.

When a Web client 110 requests access to a service or application on the Web server 106 (e.g., when the Web client 110 request information, data, or other output from the service or application), the Web client 110 may establish an actual connection to the Web server 106, such as a TCP connection. The actual connection may be represented by or included in web traffic 112 passed through the network 108, such as by being conveyed through a packet-switched network. The connection may be a continuous (e.g., in existence with the continual communication of data for a period of time representative of the lifespan of the connection) or sporadic (e.g., formed by several connections over a relatively short period of time, such as those used to communicate data packets of a larger data message). The connection may convey a request from the Web client 110 to the Web server 106 for access to the service or application. The terms "connection" and "request" may be used interchangeably herein. For example, a connection to the Web server 106 may include a request for information from a service or application hosted on the Web server 106, and a request to the Web server 106 may be conveyed to the Web server 106 by a connection with the Web server 106. The Web server 106 executes the request by providing the information, services, and the like, sought by the request. As described below, if the number of requests to the Web server 106 is sufficiently large, the Web server 106 may queue the request in an accept queue (e.g., a queue of a listen socket of the Web server 106). The request can be queued to wait for a time when the Web server 106 has sufficient resources to respond to the request with the information, services, and the like, that is sought by the request (e.g., the request can be queued until an available subprocess or thread on the Web server 106 is available to serve the request).

If the Web server 106 has a spare process or subprocess (e.g., available process or subprocess) to serve the request of the Web client 110, the request may be assigned to the process to execute the request. If no spare processes are available or an insufficient number of spare processes are available (such as when all or substantially all processes in a service pool of the Web server 106 are occupied serving existing connections or requests), then new requests may need to wait in an accept queue of the Web server 106 until a sufficient number of processes of the Web server 106 are free to execute the queued requests. A service time represents the time period that extends from receipt or queuing of a request from a Web client 110 and execution of the request (e.g., responding to the request). Alternatively, the service time for a connection or request may be referred to as an accept queue delay. As the number of connections or requests to the Web server 106 increases, the service times associated with the requests to the Web server 106 also may increase.

As described herein, the Web clients 110 establish actual connections with the Web server 106 and the artificial connection generators 104 may establish artificial connections with the Web server 106. The probe machine 102 may establish probing connections with the Web server 106. The total number of active connections with the Web server 106 may include the number of actual connections, the number of artificial connections, and/or the number of probing connections. In one embodiment, the probe machine 102 controls the number of artificial connections with the Web server 106 and measures return trip times or round trip times (RTT) associated with sending probes and requests to the Web server 106 and receiving responses thereto via the probing connections. The probe machine 102 can vary the number of artificial connections to examine changes in the RTT based on the number of artificial connections. Based on the number of artificial connections that is associated with a designated change in the RTT of one or more probes and/or requests (e.g., an increase in the RTT above a designated threshold) sent via probing connections, the probe machine 102 can derive at least one of the total number of connections with the Web server 106 and/or the number of actual connections with the Web server 106. For example, the probe machine 102 can approximate the total number of connections with the Web server 106 and based on a known number of artificial connections that is controlled by the probe machine 102, the probe machine 102 can estimate the number of actual connections between the Web clients 110 and the Web server 106. This estimated number of actual connections may be used as a popularity metric of the Web server 106, and/or of one or more services or applications hosted by the Web server 106.

Figure 2:
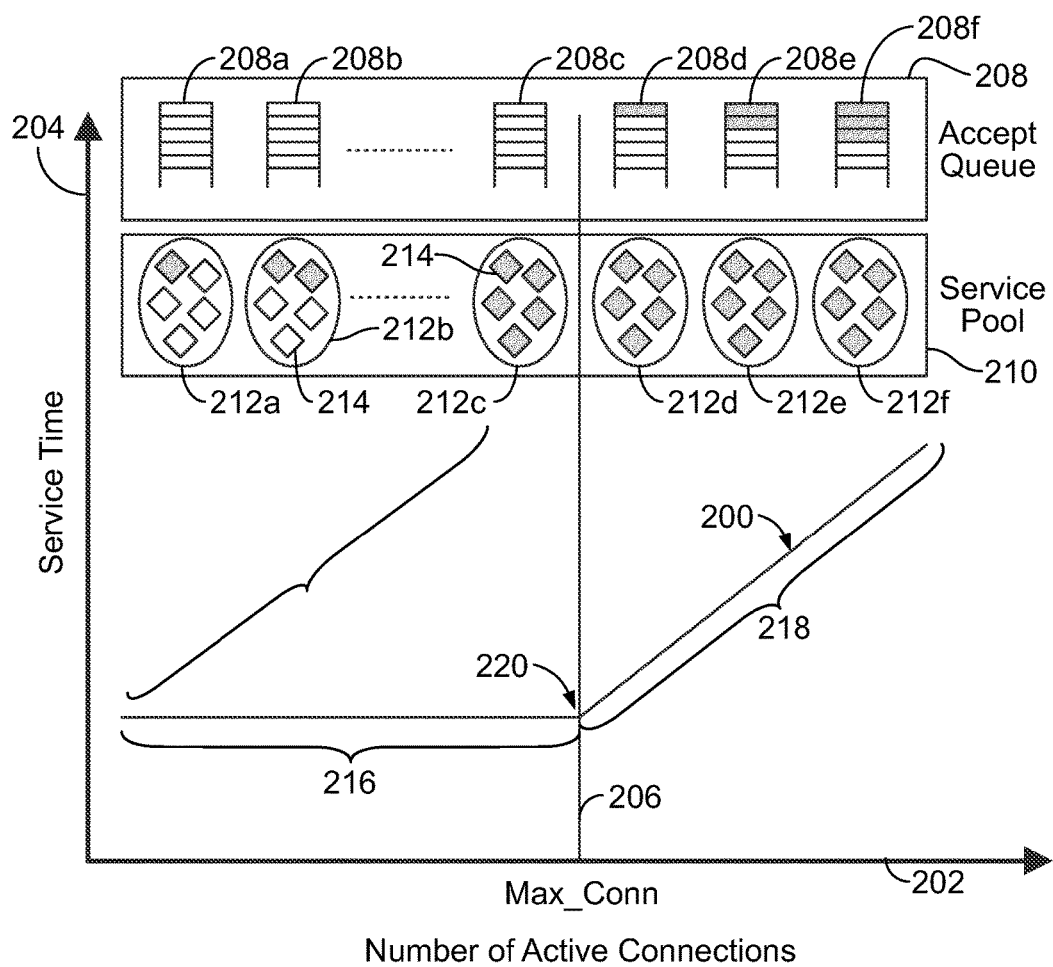
FIG. 2 illustrates an example of one relationship between active connections to a server and associated service times for responding to requests of the active connections.

FIG. 2 illustrates an example of one relationship 200 between a number of active connections to a Web server 106 (shown in FIG. 1) and associated service times for responding to requests of the active connections to the Web server 106. The relationship 200 is shown near a horizontal axis 202 representative of a number of active connections between the Web server 106 and Web clients 110 (shown in FIG. 1), artificial connection generators 104 (shown in FIG. 1), and/or the probe machine 102 (shown in FIG. 1). The relationship 200 also is shown near a vertical axis 204 representative of a service time between receipt and execution of requests conveyed by the active connections. For example, a service time may represent the time between when the Web server 106 receives a connection (e.g., a request) from a Web client 110, an artificial connection generator 104, and/or the probe machine 102, and the time at which the Web server 106 executes the request or otherwise responds to the connection, such as by providing the information or services requested by the connection. A request may be executed when the information, services, and the like, that is sought by the request is sent from the Web server 106 back to the Web client 110, probe machine 102, and/or artificial connection generator 104, when the Web server 106 stores the information sought to be stored by the request, and/or when the Web server 106 otherwise sends a response back to the sender of the request (e.g., the probe machine 102, artificial connection generator 104, and/or Web client 110).

The Web server 106 (shown in FIG. 1) can be associated with a connection limitation parameter 206, referred to herein as maximum connections or "Max_Conn." While the connection limitation parameter may be referred to as maximum connections, the connection limitation parameter need not represent the absolute largest number of active connections that may be received by the Web server 106 (shown in FIG. 1). Instead, the Web server 106 may accept and queue a number of connections that exceeds the connection limitation parameter, or maximum connections. The connection limitation parameter 206 may be predetermined and/or adjusted manually, or may be automatically adjusted by the Web server 106. In one embodiment, the connection limitation parameter 206 may be 256 or 150 connections. However, other values for the connection limitation parameter 206 may be used.

The connection limitation parameter 206 represents a threshold number of connections that are handled (e.g., responded to) by the Web server 106 with available processes before additional connections are queued. For example, when the number of active connections does not exceed the connection limitation parameter 206, the request in the connection is processed immediately. By "immediately," it is meant that the request is executed without being placed in an accept queue 208 (schematically represented above the relationship 200 in FIG. 2) or by otherwise introducing a delay between receipt of the request and execution of the request that is not necessary for the execution of the request. Without queuing the request, the service time between receipt and execution of the request may be equal to, or approximately equal to, the time involved in processing the request (e.g., "processing time").

The accept queue 208 includes several queues 208*a*, 208*b*, 208*c*, 208*d*, 208*e*, 208*f*. The queues 208*a-f* represent the state of the accept queue 208 when different numbers of active connections are established. A service pool 210 is schematically shown in FIG. 2 between the accept queue 208 and the relationship 200. The service pool 210 includes several groups 212*a-f* with darkened or non-darkened processes 214 within each group 212. The groups 212 represent operating points or states of the Web server 106 (shown in FIG. 1). The operating point of the Web server 106 indicates how "busy" the Web server 106 is in executing requests, such as by representing the number of spare processes and/or the number of processes that are occupied executing requests. Within the different operating points shown in the groups 212, the darkened processes 214 represent processes 214 that are occupied while executing a request while the non-darkened processes 214 represent spare processes 214 that are available to execute additional requests.

As shown in FIG. 2, when the number of active connections is below or less than the connection limitation parameter 206, the service time represented by the relationship 200 is approximately constant or non-increasing. Alternatively, the service time may fall below or remain below a threshold or designated time when the number of active connections is less than the connection limitation parameter 206. For example, when the number of active connections falls below the connection limitation parameter 206, spare processes may be available in the service pool 210 (represented by the non-darkened processes 214 in the groups 212*a*, 212*b*) to execute the requests conveyed by the active connections. The accept queues 208*a*, 208*b* similarly show that no requests are queued (e.g., there are no darkened areas of the accept queues 208*a*, 208*b*, where the darkened areas represent queued requests).

However, when the number of active connections or requests increases and exceeds the connection limitation parameter 206, the requests may start to accumulate in the accept queue 208 and the service time starts to increase due to the queuing delays. For example, the service time may rise above or remain above the threshold or designated time due to the increasing time involved in receiving a request, queuing the request, and executing the request when sufficient processes are available at the Web server 106). As shown by the groups 212*a-c* of the service pool 210, the number of non-darkened (or spare) processes 214 decreases while the number of darkened (or occupied) processes 214 increases. When the number of requests or connections remains less than the connection limitation parameter 206, the service time may remain approximately constant or non-increasing, as shown by a non-increasing segment 216 of the relationship 200.

When the number of requests or connections exceeds the connection limitation parameter 206, the processes 214 in the groups 212*d-f* continue to remain occupied (as shown by all processes 214 being darkened in the groups 212*d-f*). As a result, additional connections or requests are queued in the accept queue 208. The increasing number of connections or requests in the accept queue 208 are represented by the increasing darkened areas in the accept groups 208*d-f*. The service time required to execute the requests or connections continues to increase after the processes 214 are occupied, as shown by the positive slope of the relationship 200. For example, as there are an insufficient number of spare processes 214 to execute the requests that are in excess of the connection limitation parameter 206, the time required to execute the requests may increase, as shown by an increasing segment 218 of the relationship 200. The additional time needed to process the queued request may be referred to as an accept queue latency. The increasing segment 218 is shown as a linear relationship having a positive slope. However, the increasing segment 218 alternatively may be presented as a non-linear relationship.

The intersection between the non-increasing and increasing segments 216, 218 of the relationship 200 between the number of connections and the service time may be referred to as a "knee" point 220. In the illustrated embodiment, the knee point 220 represents the state of the Web server 106 (shown in FIG. 1) in which adding more active connections or requests to the Web server 106 can result in an increased service time for executing the requests of the additional active connections. In general, as the number of requests increases in excess of the connection limitation parameter 206, the service time for newly received requests also increases.

In one embodiment, the processes 214 may continue to execute requests in the accept queue 208 with the executed requests removed from the accept queue 208. The processes 214 may execute the requests until the number of connections or requests decreases below the connection limitation parameter 206. Alternatively, if the number of requests for a service or application on the Web server 106 (shown in FIG. 1) continues to exceed the connection limitation parameter 206, the processes 214 may continue executing the requests as the requests are queued. A connection to the Web server 106 may remain open, or "active," while the connection or the request conveyed by the connection to the Web server 106 waits to be serviced by the Web server 106. Once the information or other services sought by the request conveyed by the connection is provided by the Web server 106 to the Web client 110, the connection and request may be closed, or "inactive."

Returning to the discussion of the EWM system 100 shown in FIG. 1, the EWM system 100 can estimate the number of active connections attached to the Web server 106 by increasing the operating point or state of the Web server 106 close to, or to, the knee point 220 shown in FIG. 2. As described below, the operating point or state of the Web server 106 may be increased over relatively short time periods or scales by increasing the number of active connections to the Web server 106 up to the knee point 220 (e.g., to the connection limitation parameter 206) or at least toward the knee point 220. Such an approach can enable accurate estimates of the number of active connections to the Web server 106. In operation, the probe machine 102 sends probe packets 114 to the monitored Web server 106 over probing connections with the Web server 106. The probing connections may be represented by the probe packets 114 shown in FIG. 1. The probe packets 114 may alternatively be referred to as probing packets. Although not shown in FIG. 1, the probe packets 114 may be sent through the network 108 or through one or more other networks. The artificial connection generators 104 may include or represent a cluster of machines that are used to shift or move the operating point or state of the Web server 106 to or toward the "knee" point 220 shown in FIG. 2.

In one embodiment, the probe machine 102 sends probe packets 114 to the Web server 106. The probe packets 114 can be used to measure or approximate the service time of the Web server 106 and monitor the service time or queue length (e.g., the length of time between receipt of a request that is queued and execution of the queued request) in the accept queue 208 (shown in FIG. 2) of the Web server 106. The probe machine 102 may send a variety of different types of probe packets 114. For example, the probe machine 102 may send TCP and HTTP probe packets as the probe packets 114 to the Web server 106. The probe packets 114 may establish a connection or request to the Web server 106. The probe machine 102 may send control messages to the artificial connection generators 104 to control a number of connections that are sent to the Web server 106 by the artificial connection generators 104. For example, the probe machine 102 may control how many artificial connections are established with the Web server 106 by the artificial connection generators 104 by sending control messages to the artificial connection generators 104. The control messages may dictate how many artificial connections are established (such as by sending probe packets, requests, and the like).

Figure 3:
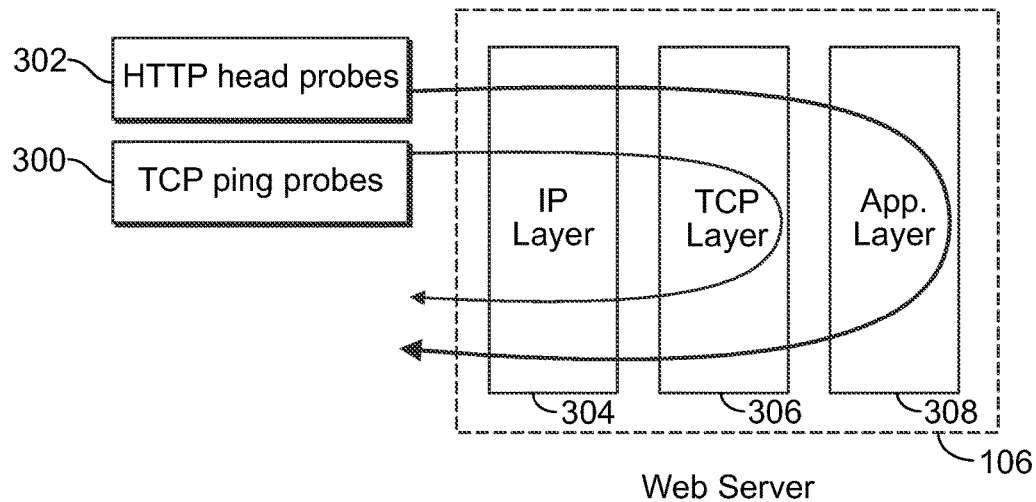
FIG. 3 is a schematic illustration of how probe packets sent from a probe machine shown in FIG. 1 interact with a server in accordance with one embodiment.

FIG. 3 is a schematic illustration of how the probe packets 114 (shown in FIG. 1) sent from the probe machine 102 (shown in FIG. 1) interact with the Web server 106 in accordance with one embodiment. The probe packets 114 can include ping probes 300 and request probes 302. For example, the probe machine 102 may transmit a TCP ping probe as the ping probe 300 and an HTTP head probe as the request probe 302 to the Web server 106 through the network 108 (shown in FIG. 1) and/or one or more other connections or networks. The use of a TCP ping probe is one example of the types of ping probes 300 that may be used. Alternatively, another ping probe may be used. The TCP ping probe can travel from the probe machine 102 (shown in FIG. 1) through a network layer 304, such as an IP layer, to a transport layer 306, such as a TCP layer, of the Web server 106. The TCP ping probe may to the probe machine 102 from the Web server 106 through the network 108 and/or one or more other connections or networks.

In one embodiment, the probe machine 102 measures the round trip time period (which also may be referred to as return trip time period) over which the ping probe 300 travels from the probe machine 102 to the Web server 106 and back. This time period may be recorded by the probe machine 102 and referred to as a network latency. For example, the network latency can represent the time delay or time period for transmitting the ping probe 300 through the network 108 and/or one or more other connections or networks between the probe machine 102 and the Web server 106.

The probe machine 102 sends the request probe 302 from the probe machine 102 to the Web server 106 through the network 108 and/or one or more other connections or networks. The request probe 302 may be sent at the same time as, before, or after the probe machine 102 sends the ping probe 300. Alternatively, different probe machines 102 may transmit the ping probe 300 and the request probe 302. For example, a first probe machine 102 disposed at a first geographic location may send the ping probe 300 and a second probe machine 102 disposed at the same geographic location may send the request probe 302.

The request probe 302 can travel through the network layer 304 and transport layer 306 of the Web server 106 to an application layer 308 of the Web server 106. In one embodiment, the request probe 302 is executed by one or more processes (e.g., services or applications) of the Web server 106. The request probe 302 may return back to the probe machine 102 through the network 108 and/or one or more other connections or networks. The probe machine 102 may measure the round trip time period over which the request probe 302 travels to the Web server 106 and back to the probe machine 102. The round trip time of the request probe 302 may be referred to as the request latency. The request latency may be equal the network latency (as measured by the ping probe 300) plus the service time of the Web server 106. The request latency may represent the time required for the request probe 302 to travel to the Web server 106 (e.g., the network latency) and the time required for the request probe 302 to be serviced by the Web server 106 (e.g., the service time). For example, if the Web server 106 has no pending requests or a relatively small number of pending requests waiting in an accept queue of the Web server 106 (e.g., less than the connection limitation parameter 206 shown in FIG. 2), then the network latency measured by the ping probe 300 may be equal to or approximately equal to (e.g., within a designated threshold or range) the service latency measured by the request probe 302. As another example, if the Web server 106 has a relatively large amount of pending requests waiting in the accept queue (e.g., a number greater than the connection limitation parameter 206), then the network latency measured by the ping probe 300 may be much less than the service latency measured by the request probe 302.

In one embodiment, the EWM system 100 may estimate the service time of the Web server 106 by subtracting the network latency from the request latency. When the operating point of the Web server 106 is below the knee point 220 (shown in FIG. 2) of the relationship 200 (shown in FIG. 2), the service time may not be effected by an accept queue delay (e.g., the time period between when a connection is received into the accept queue and when the connection is serviced by one or more processes 214 of the Web server 106). For example, the request probes 302 may be serviced (e.g., responded to) within a relatively short time after being received by the Web server 106. As a result, the time distance or difference between the ping probe 300 and the request probe 302 may be smaller than when the operating point of the Web server 106 is above the knee point 220. For example, once the number of requests or connections exceeds the knee point 200, the accept queue delay increases, thereby resulting in a longer service time. Consequently, the request latency may increase in time while the network latency remains approximately the same or experiences smaller changes.

Returning to the discussion of the EWM system 100 shown in FIG. 1, the artificial connection generators 104 may be used to shift the operating point of the Web server 106 by generating additional connections with requests to the Web server 106. In one embodiment, the artificial connection generators 104 create the additional connections by transmitting open-ended requests to the Web server 106 over artificial connections with the Web server 106. An open-ended request may be an incomplete or unfinished request for information or data that is transmitted to the Web server 106. The open-ended request may be presented to the Web server 106 such that the open-ended request cannot be fulfilled (e.g., the requested information cannot be sent in reply) by the Web server 106 in one embodiment. By way of example, an open-ended request may be an unfinished or incomplete HTTP HEAD request, HTTP GET request, HTTP SET request, although one or more other HTTP or non-HTTP requests may be used. An unfinished or incomplete request may be a request that includes sufficient information for the Web server 106 to keep an open active connection (e.g., an artificial connection) with the artificial connection generator 104 but less than all of the information required or needed by the Web server 106 to process or execute the request. The connection between the artificial connection generator 104 and the Web server 106 is shown as an artificial connection 116 ("artificial http connections" in FIG. 1). In one embodiment, the open-ended request may be an HTTP HEAD request having an HTTP header without the last carriage return and/or the line feed symbols. Alternatively, another open-ended request may be used.

Upon receipt of the open-ended request, the Web server 106 may keep an artificial connection with the artificial connection generator 104 that transmitted the request open because the Web server 106 is waiting the completion of the open-ended request. For example, the Web server 106 may be waiting for the complete header of the HTTP HEAD request. In one embodiment, a connection with an artificial connection generator 104 is considered open when the request conveyed by the connection is placed into an accept queue of the Web server 106, as described above.

The open-ended request may place a negligible or relatively small demand on the computational resources of the Web server 106 while holding open one or more service slots for the Web server 106. The Web server 106 may keep the connection alive or open until the artificial connection generator 104 disconnects from the Web server 106 or a connection timeout of the Web server 106 expires (typically 300 seconds, for example). In one embodiment, the EWM system 100 keeps artificial connections 116 alive or established between the artificial connection generator 104 and the Web server 106 over relatively small time scales or periods, such as time scales of several seconds. The time scales over which the artificial connections 116 are maintained or kept alive may be as long as or longer than the time period required for an algorithm performed by the EWM system 100 to estimate the active connections of the Web server 106 to converge, as described below.

Once the algorithm converges (as described below), the number of connections attached to the Web server 106 may be equal to or approximately equal to the connection limitation parameter 206 (shown in FIG. 2) in one embodiment. For example, the number of connections to the Web server 106 may be equal to or approximately equal to the sum of the number of active connections from the Web clients 110 and the number of artificial connections from the artificial connector generators 104. When the total number of connections reaches or approaches the connection limitation parameter 206, additional connections can cause the service times of the request probes 302 (shown in FIG. 3) sent by the probe machine 102 to increase. The probe machine 102 can use this increase in service time to identify when the total number of connections is at or near the connection limitation parameter 206. For example, and as described above, while the number connections with the Web server 106 remains at or below the connection limitation parameter 206, the service time may remain constant or approximately constant over time and/or as more connections with the Web server 106 are established. Once the number of connections exceeds the connection limitation parameter 206, the service time for additional connections may increase due to the queuing of the additional connections before being services. As a result, the number of active connections between the Web clients 110 and the Web server 106 may be estimated or calculated by determining a difference between the number of artificial connections 116 and the connection limitation parameter 206 of the Web server 106.

In one embodiment, the EWM system 100 may estimate the connection limitation parameter 206 by monitoring the number of artificial connections 116 between the artificial connection generators 104 and the Web server 106 over time. For example, the EWM system 100 may periodically determine the number of artificial connections 116 with the Web server 106 and store the number of artificial connections 116 in a tangible and non-transitory computer readable storage medium, such as a computer hard drive, RAM, ROM, EEPROM, or other type of memory that is part of or coupled with the probe machine 102 and/or the artificial connection generators 104. In one embodiment, the EWM system 100 stores the number of artificial connections in an internal memory of the probe machine 102. The EWM system 100 may calculate the connection limitation parameter 206 as an average, median, or other statistical measure of a plurality of artificial connections 116 obtained at different time periods over a 24 hour time period. Alternatively, the connection limitation parameter 206 may be calculated based on other measurements and/or based on the number of artificial connections 116 obtained at different time periods over a shorter or longer time period.

Figure 4:
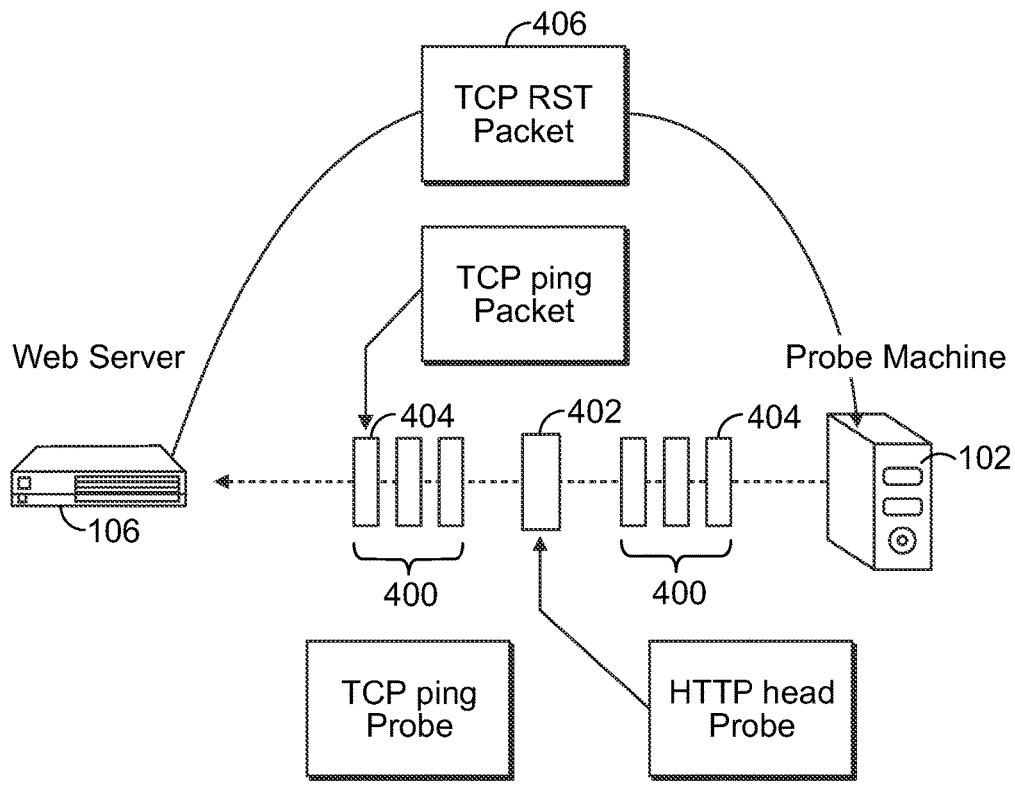
FIG. 4 is a schematic illustration of the probe machine shown in FIG. 1 transmitting probes to a server using probing connections in accordance with another embodiment.

FIG. 4 is a schematic illustration of the probe machine 102 transmitting probes to the Web server 106 using probing connections with the Web server 106 in accordance with another embodiment. As described above, the probe machine 102 can establish probing connections with the Web server 106 by transmitting probes to the Web server 106. The probes can be used to estimate the network latency and/or accept queue delay (e.g., service time) of the Web server 106. The probe machine 102 may send ping probes 400 (e.g., TCP ping probes) that include one or more data packets 404 (e.g., packetized data that may be communicated as separate packets and assembled into a larger data message upon receipt of the packets). In the illustrated embodiment, the TCP ping probes include a plurality of ping packets 404 or ping flags 404 (e.g., TCP ACK packets and shown as "TCP ping Packet 404" in FIG. 4) with one or more ACK numbers to the Web server 106. As shown in FIG. 4, each ping probe 400 may include three ping packets 404. Alternatively, a smaller or greater number of ping packets 404 may be included in the TCP ping probe. In another embodiment, the ping probes 400 may each include different numbers of the ping packets 404.

The number of the ping packets 404 may be arbitrary, random, predetermined, and/or manually established. The Web server 106 may be unable to recognize the ping packet 404 and, as a result, the Web server 106 may respond by transmitting one or more responsive packets 406 or responsive flags ("TCP RST packet 406" in FIG. 4) back to the probe machine 102. As described above, the EWM system 100 (shown in FIG. 1) may measure the round trip time (RTT) of the corresponding ping packet 404 and responsive packets 406, and estimate the network latency from the probe machine 102 to the Web server 106 based on the route trip time (RTT).

In one embodiment, the probe machine 102 may transmit TCP ACK packets as the ping packets 404 in the ping probes 400 as TCP ping probes instead of User Datagram Protocol (UDP) probes or Internet Control Message Protocol (ICMP) probes for one or more reasons. First, some routers and firewalls that convey the ping probes 400 may drop UDP or ICMP probes, or treat the UDP or ICMP probes with lower priority than other packets in the probes, such as TCP ACK packets. Second, TCP ACK packets or probes that include TCP ACK packets (or other TCP packets) may raise fewer security alarms or alerts than one or more other probes, such as UDP or ICMP probes.

Also as described above, the probe machine 102 may transmit the request probe 402 (e.g., "HTTP head Probe") to the Web server 106 to estimate the service time (e.g., accept queue delay) of the Web server 106. In the illustrated embodiment, the request probe 402 includes an HTTP HEAD probe or request that is sent to the Web server 106. The HTTP HEAD request may ask for a HTTP header of a Web page provided by the Web server 106. Alternatively, the request probe 402 may seek other information or data from the Web server 106. The HTTP HEAD request may be used to test recent modifications of the Web page and may be a light-weight HTTP message because the protocol causes the probe machine 102 to transfer the HTTP header of the HTTP object without the body of the object. As a result, the overhead of the message or request probe 402 may be relatively small for a variety of file types (e.g., music, zip, pdf, etc). The latency of the HTTP HEAD probe 402 can accumulate the network latency and the service time of the Web server 106.

When the Web server 106 operates below the knee point 220 (shown in FIG. 2), or during the non-increasing segment 216 (shown in FIG. 2) of the relationship 200 (shown in FIG. 2) between service time and the number of active connections with the Web server 106, the service time of the Web server 106 may be relatively small and the latency of the request probe 402 (e.g., a HTTP HEAD probe) may be relatively close to the network latency associated with the ping probe 400 (e.g., TCP ping probe) and/or one or more of the ping packets 404 (e.g., TCP ACK ping packets). On the other hand, when the number of requests in the accept queue 208 (shown in FIG. 2) of the Web server 106 is building up or growing, the service time needed to process the request probe 402 may increase, such as when the Web server 106 operates at or above the knee point 220.

In the illustrated embodiment, the probe machine 102 of the EWM system 100 (shown in FIG. 1) may send three back-to-back ping packets 404 in each ping probe 400 in front of and behind the request probe 402. For example, the EWM system 100 may sequentially send a leading TCP ping probe 400, then a request probe 402, followed by a trailing TCP ping probe 400. Alternatively, a different number of ping packets 404 may be included in the ping probes 400, a different number of ping probes 400 may be sent, a different number of request probes 402, and/or a different order of the ping probes 400 and request probes 402 may be sent. In one embodiment, the probe machine 102 may not transmit any other probes or packets between the leading ping probe 400 and the request probe 402 and/or between the request probe 402 and the trailing ping probe 400.

The ping probes 400 (e.g., TCP ping probes) may be transmitted before and after the request probe 402 to more accurately detect potential congestion events of the network 108 (shown in FIG. 1) that may interfere with measurements of the service time of the Web server 106. For example, the network latency may vary during the measurement of the service time of a Web server 106. Transmitting multiple ping probes 400 and/or multiple ping packets 404 in one or more of the ping probes 400 during the measurement of the service time of the Web server 106 may allow for the EWM system 100 to adjust the measured service time based on network latency variations, as opposed to sending a single ping probe 400, which may not accurately reflect the network latency. For example, the EWM system 100 may measure the network latency associated with the Web server 106 as an average, median, deviation, or other statistical measure of the network latencies measured from several ping probes 400 and/or ping packets 404.

The leading ping probes 400 (e.g., the TCP ping probes transmitted prior to the request probe 402), the request probe 402, and the trailing ping probes 400 (e.g., the TCP ping probes transmitted subsequent to the request probe 402) may be referred to as a "round" of measurement of the service time of the Web server 106. For example, in each round, or iteration, of the measurement of the service time of the Web server 106, the probe machine 102 may send three probes to the monitored Web server 106 including: one ping probe 400, one request probe 402, and another ping probe 400. The probes can be sent back-to-back to the monitored Web server 106 and the EWM system 100 can measure the response time of each request in the request probes 402. The ping probes 400 may be used estimate the network latency from the start of the round of measurement to the end of the round of measurement of the service time. If network congestion occurs or changes during the round of measurement of the service time, such as when a difference in round trip times (RTT) between the two or more ping probes 400 becomes significant (e.g., the RTT of the trailing ping probe 400 is significantly longer than the RTT of the leading ping probe 400), the EWM system 100 may simply disregard this round of measurement of the service time because the EWM system 100 may be unable to determine how much of the delay or RTT is contributed from the service time of the Web server 106 and/or how much of the delay or RTT is contributed from the varying network congestion. On the other hand, if there is little to no network congestion and/or if the network latency does not significantly vary during a round of measurement, the service time of the Web server 106 may be more accurately estimated by subtracting the RTT of one or more of the ping probes 400 from the RTT of one or more of the request probes 402. In one embodiment, the EWM system 100 calculates the service time by subtracting an average, median, variance, or other statistical measure of the RTTs of one or more ping probes 400 from the RTT of one or more of the request probes 402. Alternatively, the service time is calculated by subtracting the RTT of only one of the ping probes 400 from the RTT of the request probe 402.

Returning to the discussion of the EWM system 100 shown in FIG. 1, the EWM system 100 can generate artificial connections 116 to the monitored Web server 106 in an attempt to shift the operating point of the Web server 106 toward the knee point 220 (shown in FIG. 2) in one embodiment. The probe machine 102 may control creation of the artificial connections 116 by the artificial connection generators 104 using control signals 118 transmitted to the artificial connection generators 104. In one embodiment, the EWM system 100 may employ a relatively conservative multiplicative increase and multiplicative decrease (MIMD) control mechanism to control the number of artificial connections 116 to the Web server 106. Alternatively, a different control mechanism or algorithm may be used.

In one embodiment, the EWM system 100 establishes the number of artificial connections 116 for a round of measurement of the service time of the Web server 106 using the following relationship:

$$\text{NewConn} = m \times \text{OldConn} + \text{Rand} \qquad \text{(Eqn. 1)}$$

where OldConn represents the number of artificial connections 116 during a previous round of measurement (such as the previous round of measurement, an average or median of previously measured number of artificial connections 116, or a designated amount), m represents a scaling parameter, Rand represents a random number, and NewConn represents the number of artificial connections 116 to be established for a current or future round of measurement of the service time of the Web server 106. By way of example, the random number (Rand) may be a random integer between -5 and +5 (excluding 0 and/or inclusive of -5 and/or +5)). Alternatively, the random number (Rand) may be another random integer or a non-random number. The random number (Rand) may assist in avoiding synchronization effects that may be common in network controlled systems.

In one embodiment, the value of the scaling parameter (m) may be set based on the phase of the MIMD control mechanism. For example, during a multiplicative increase phase of the MIMD control mechanism, the value of the scaling parameter (m) may be set to 1.5 while during a multiplicative decrease phase of the MIMD control mechanism, the value of the scaling parameter (m) may be set to 0.75. Alternatively, different numbers for the scaling parameter (m) may be used.

As described above, the EWM system 100 measures the number of active connections to the Web server 106 within relatively short convergence times. A convergence condition may refer to the time at which the measurement of the number of active connections to the Web server 106 is performed and/or when the artificial connections 116 to the Web server 106 are terminated. In one embodiment, the EWM system 100 is considered to have converged, or reached the convergence condition, when the following condition is reached:

$$\frac{C_i - C_d}{\text{MaxConn}} < P \qquad \text{(Eqn. 2)}$$

where $C_d$ represents a number of artificial connections 116 to the Web server 106 for which little to no accept queue delay is measured (such as for connections 116 in which the accept queue delay does not exceed a predetermined or adjustable threshold), $C_i$ represents a number of artificial connections 116 for which an accept queue delay is measured (such as for connections 116 in which an accept queue delay of at least a predetermined or adjustable threshold time period is measured), MaxConn represents the connection limitation parameter 206 (shown in FIG. 2), and P represents a confidence value, deviation, or error limit. In one embodiment, the term $C_d$ represents a maximum or other designated number of artificial connections 116 for which little to no accept queue delay is measured and/or $C_i$ represents a minimum or other designated number of artificial connections 116 for which an accept queue delay is measured. In general, $C_i$ will exceed $C_d$. The P term may be adjustable and, in one embodiment, has a value of 0.15, or 15%. As a result, in one embodiment, the EWM system 100 converges when the number of artificial connections 116 around the knee point 220 (shown in FIG. 2) is within 15% of the connection limitation parameter 206, or MaxConn.

At the convergence time, the EWM system 100 may estimate or derive the number of active connections to the Web server 106 based on the following relationship:

$$C_a = \text{MaxConn} - \frac{C_i + C_d}{2} \qquad \text{(Eqn. 3)}$$

where $C_a$ represents the estimated number of active connections, or non-artificial connections between the Web clients 110 and the Web server 106. Alternatively, a different relationship may be used. The estimated number of actual connections may be derived from the estimated number of active connections. For example, as the number of artificial connections 116 and/or probing connections with the Web server 106 can be known and controlled by the probe machine 102, the number of actual connections between the Web clients 110 (e.g., not the probe machine 102 and/or artificial connection generators 104) and the Web server 106 may be estimated as a difference between the estimated number of active connections and the number of artificial connections and/or probing connections. The number of active and/or actual connections can serve as a popularity metric of the Web server 106 and/or one or more services or applications hosted by the Web server 106. For example, a first service hosted by a first Web server 106 having a greater number of active and/or actual connections at a given time or over a period of time may be more popular (e.g., accessed by more users) than a second service hosted by the same or a different, second Web server 106 having a smaller number of actual connections (and/or active connections if the numbers of artificial connections to the Web servers are the same or approximately the same).

The EWM system 100 may store one or more measured quantities associated with the Web server 106 as historical information. For example, previously measured numbers of artificial connections 116 needed to push the Web server 106 to the knee point 220 (shown in FIG. 2) may be stored in a memory of the probe machine 102 (or another memory). When this history information is available, the EWM system 100 may use the previously measured numbers of artificial connections 116 to set an initial number of artificial connections 116 used in future measurements of the Web server 106. For example, the EWM system 100 may set an initial number of artificial connections 116 for a new round of measurements of a Web server 106 to the average, median, or other statistical measure of one or more previously measured artificial connections 116 needed to push the Web server 106 to the knee point 220. The EWM system 100 may store or cache historical information related to the connection limitation parameter 206 for the Web server 106. The value of the connection limitation parameter 206 may be unlikely to change over relatively long time periods.

The measurement overhead caused by the EWM system 100 can be relatively low. As described above, in one embodiment, each measurement round involves sending one TCP ping probe 400 (shown in FIG. 4), followed by an HTTP HEAD probe 402 (shown in FIG. 4), followed by another TCP ping probe 400. The overhead for each TCP ping probe 400 may be approximately 0.32 kBytes. For each HTTP HEAD probe 402, the overhead may be approximately 1 kByte. As a result, the measurement overhead for each measurement round may be approximately 1.64 kBytes in one embodiment. If the average convergence time of the EWM system 100 is approximately 4.5 rounds, the measurement overhead for the 4.5 rounds can be approximately 7.38 kBytes. If each measurement round is upper bounded by a time period of 3 seconds or less, the duration of a typical convergence or measurement epoch (or time to reach convergence and measure the number of active connections between the Web clients 110 and the Web server 106) may be approximately 13.5 seconds. Consequently, the bandwidth overhead placed on the Web server 106 may be approximately 4.37 kbits per second during the measurement epoch.

In one embodiment, the 4.37 kbits per second overhead may not significantly increase if the EWM system 100 needs more rounds to converge because the EWM system 100 may pace itself for 3 seconds per measurement round and the overhead of the probe packets can be fixed. The EWM system 100 can schedule probing or measurement epochs over arbitrary or random time intervals (such as time intervals that are no greater than 13.5 seconds), depending on the time scales at which an endpoint using the EWM system 100 desires to estimate the popularity trends of the Web server 106. For example, in scenarios when the EWM system 100 is measuring a large Web server infrastructure (e.g., mirror sites of a Web service), the EWM system 100 can schedule measurement epochs or intervals over longer time scales (e.g., 5 minutes) in a round robin fashion between the Web servers 106 in the infrastructure. In such a scenario, the average measurement overhead placed on the Web servers 106 of the infrastructure may be lower. As a result, the overhead of the EWM system 100 may not disturb the daily operations of the Web server 106 and the network overhead may be small or negligible.

In one embodiment, a Web browser of a Web client 110 may attempt to accelerate loading of a Web page hosted by a Web server 106 by initiating multiple HTTP connections to the Web server 106 and concurrently downloading multiple HTTP objects from the Web server 106. As a result, it may be possible that one Web client 110 has multiple active connections to the same Web server 106. The EWM system 100 may develop relationships based on characteristics of content hosted at the Web site hosted by the Web server 106 and, based on understanding of how modern Web browsers utilize multiple connections from the Web clients 110, the EWM system 100 may measure a "most likely" number or a distribution of active connections with the Web client 110 based on the measured number of active connections.

In another embodiment, a cluster of Web servers 106 may be used to host a relatively large Web site. A load balancer may be used to manage a set of Web servers 106 for reliability and/or load balancing purposes. The EWM system 100 can monitor the Web server cluster as a single Web server 106 and measure the aggregated active connections to the cluster. The load balancer may uniformly or approximately uniformly distribute requests to the Web servers 106 in the cluster and the EWM system 100 may measure the active connections to the cluster.

In one aspect, the EWM system 100 may avoid being misinterpreted as a Denial of Service (DoS) attack by a monitored Web server 106. For example, the EWM system 100 may avoid being mischaracterized as a DoS attack due to relatively short convergence times of the EWM system 100 and relatively low network overhead of the EWM system 100.

In another aspect, one or more entities employing multiple EWM systems 100 (or clusters of one or more EWM systems 100 or one or more components of several EWM systems 100) may schedule probes or measurement epochs to avoid synchronization effects, such as artificial connections 116 generated by a first EWM system 100 or a first instance of a EWM system 100 being counted as Web traffic or active connections 112 by a second EWM system 100 or a second instance of a EWM system 100. For example, an entity may use schedules to avoid one endpoint being misinterpreted as real background web traffic by other endpoints. Consecutive measurements by endpoints can be spaced apart (e.g., 10 minutes) to avoid misinterpreting the measurements of one endpoint being counted as actual or active connections by another endpoint of a common entity. Alternatively or additionally, such synchronization measurement issues may be alleviated, reduced, or eliminated by randomizing intervals between measurements of different endpoints within an entity.

In another aspect, when multiple Web sites are hosted on a fewer number of Web servers 106, one embodiment of the EWM system 100 may measure the aggregated Web traffic or popularity of multiple Web sites by measuring the active connections to the Web servers 106 instead of the traffic to individual Web sites. The active connections or traffic to the Web server 106 co-hosting multiple Web sites may provide accurate upper bounds for traffic to the Web sites.

In one embodiment, the EWM system 100 may be relatively easy to scale upward to large applications. For example, one or more of the probe machine 102 and/or the artificial connection generators 104 may be embodied in a single or multiple computer devices, such as one or more Linux-based machines or servers. Alternatively, computer devices other than Linux-based machines or servers may be used.

In another embodiment, the EWM system 100 may cross-validate measurements of the active connections to a Web server 106. For example, an administrator of a Web server 106 may artificially or intentionally modify the measured service times or accept queue delays or latencies of the Web server 106. The administrator may do so in order to artificially increase the popularity of the services or applications provided by the Web server 106. In one embodiment, the EWM system 100 may deploy one or more additional, or "audit", probe machines 102 to probe to the monitored Web server 106 at a random time within the measurement epoch of the EWM system 100 to cross-validate the HTTP probe measurement results from the main probe machine 102. Hence, the EWM system 100 can prune unreliable measurement records from its data set if there are mismatches between the monitoring and auditing probe machines 102.

In another aspect, a request protocol, such as a HTTP HEAD protocol, may be disabled by the administrator of the Web server 106. Web proxies and browsers hosted by the Web server 106 may rely on the HTTP HEAD protocol to determine the freshness or age of a Web object. If the administrator disables the HTTP HEAD protocol on the Web server 106, the browsers and proxies may download the entire HTTP objects to check the freshness or age of the corresponding HTTP objects. Some proxies and browsers may not work properly because the proxies or browsers may assume that the HTTP HEAD protocol is supported by the Web server 106. Additionally, when the HTTP HEAD protocol is disabled, the network usage of the Web server 106 may grow because Web clients have to transfer the entire Web object.

If the HTTP HEAD protocol is disabled, the EWM system 100 can adopt an alternative method to send request probes 302, 403 (shown in FIGS. 3 and 4), such as HTTP HEAD probes, to the Web server 106. For example, the probe machine 102 can use HTTP GET probes to transfer or otherwise communicate a relatively small and/or frequently accessed Web object (e.g., the "favorite icon" image of a Web site) with the Web server 106. As for the artificial connections 116, the artificial connector generators 104 can send an HTTP GET request with an unfinished HTTP header to generate the artificial connections 116. If the Web server 106 is set to have a relatively short connection expiration time or timeout period that may disconnect the artificial connections 116 before the EWM system 100 converges, then the artificial connection generators 104 may establish the artificial connections 116 by connecting to the Web server 106 and fetching one or more, or a series, of relatively small HTTP objects during the measurement epoch of the EWM system 100.

In another aspect, the EWM system 100 can account for Web clients 110 that establish multiple connections to the Web server 106 to concurrently download multiple objects of content that is hosted on the Web server 106. Some web browsing software on the Web clients 110 may accelerate loading of the multiple objects of the hosted content from the Web server 106 by initiating multiple HTTP connections (e.g., as represented by the web traffic 112) to the Web server 106 and concurrently downloading multiple HTTP objects from the Web server 106. As a result, a single Web client 110 may have multiple active HTTP connections to the same Web server 106.

In one embodiment, the EWM system 100 (e.g., the probe machine 102) can account for such a one-to-many relationship (e.g., one Web client 110 having many connections with a Web server 106) between the number of Web clients 110 and the number of active or actual connections with the Web server 106 because the number of active or actual connections that is estimated or calculated by the EWM system 100 is still based on the number of Web clients 110 connecting to the Web server 106. For example, as more Web clients 110 connect with a Web server 106 (including those that concurrently establish multiple connections with the Web server 106), the number of active or actual connections that is calculated as described herein increases. Conversely, as fewer Web clients 110 connect with a Web server 106 (including those that concurrently establish multiple connections with the Web server 106), the number of active or actual connections that is calculated as described herein also decreases.

In another embodiment, the EWM system 100 estimates or calculates the number of active or actual connections between the Web clients 110 and a Web server 106 based on one or more characteristics of the content that is hosted on the Web server 106 and accessible to the Web clients 110 from the Web server 106. These characteristics are referred to as "content characteristics" and can include, for example, a type or category of the content that is hosted on the Web server 106, a size (e.g., expressed in bytes, kilobytes, megabytes, gigabytes, and the like) of objects (e.g., files, folders, and the like) of the content hosted on the Web server 106, among other factors. The type or category of the content can reflect what the content is. For example, text content, images, videos, music files, and the like, may be different types or categories of hosted content.

The Web servers 106 that host content associated with one or more types or categories of content and/or larger sized objects of the content may be identified by the EWM system 100 as potentially inflating Web servers 106. For example, Web clients 110 may be more likely to generate multiple concurrent connections with Web servers 106 that host types or categories of files that tend to be or are larger than other types or categories of files (e.g., images or videos relative to text files). The EWM system 100 can examine the types or categories of content hosted on the Web server 106 and/or the file sizes of the content hosted on the Web server 106 and, based on these factors, determine that the number of connections with the Web server 106 is potentially inflated (e.g., greater than the actual number of active or actual connections). The EWM system 100 can decrease the calculated or estimated number of active or actual connections with Web servers 106 identified as being potentially inflating Web servers 106. The EWM system 100 can decrease the calculated or estimated number of connections by decreasing the number of connections, such as by subtracting a designated number from the calculated or estimated number of connections, multiplying the number of connections by a designated number that is less than one, and the like. The designated number may be based on the content characteristics associated with the Web server 106. For example, larger designated numbers may be associated with one type or category of content (e.g., videos or music) relative to other types or categories of content (e.g., images). As another example, larger designated numbers may be associated with larger file sizes of the content (e.g., 1 megabyte or greater) relative to other types or categories of content (e.g., less than 100 kilobytes).

In another aspect, the EWM system 100 can account for content that is hosted on several Web servers 106, such as occurs in Content Distribution Network (CDN) services. CDN services may replicate content hosted on a first Web server 106 on one or more additional Web servers 106 in order to make the content available in multiple locations (e.g., closer to more Web clients 110). As a result, monitoring the estimated or calculated number of active or actual connections to the first Web server 106 may not be the most accurate representation of the popularity of content that is co-hosted on the first Web server 106 and one or more additional Web servers 106.

In one embodiment, the EWM system 100 accounts for such replicated content on multiple Web servers 106 by determining which Web servers 106 host non-replicated content that is related to the replicated content (e.g., downloaded or otherwise accessed with the replicated content). For example, for a web site that includes text content and associated image and video content, the image and video content may be replicated on multiple Web servers 106 while the text is hosted on a single, or origin, Web server 106. The Web servers 106 hosting related content may be referred to as a family of Web servers 106. The EWM system 100 may examine the content hosted on multiple Web servers 106, such as by downloading or otherwise accessing the content hosted on the Web servers 106, in order to determine which Web servers 106 are in a family of Web servers 106. Once the family of Web servers 106 is identified, the EMW system 100 (e.g., the probe machine 102) can determine which Web servers 106 in the family host non-replicated content, such as one or more files of content related to replicated content that is hosted on a single Web server 106 (e.g., is not replicated on multiple Web servers 106). In order to determine popularity metrics of the content hosted by the family of Web servers 106, the EWM system 100 may then estimate or calculate the number of actual or active connections between the Web clients 110 and the Web server 106 that hosts the unique, or non-replicated, content that is related to the replicated content on the other Web servers 106 in the same family of Web servers 106.

Figure 5:
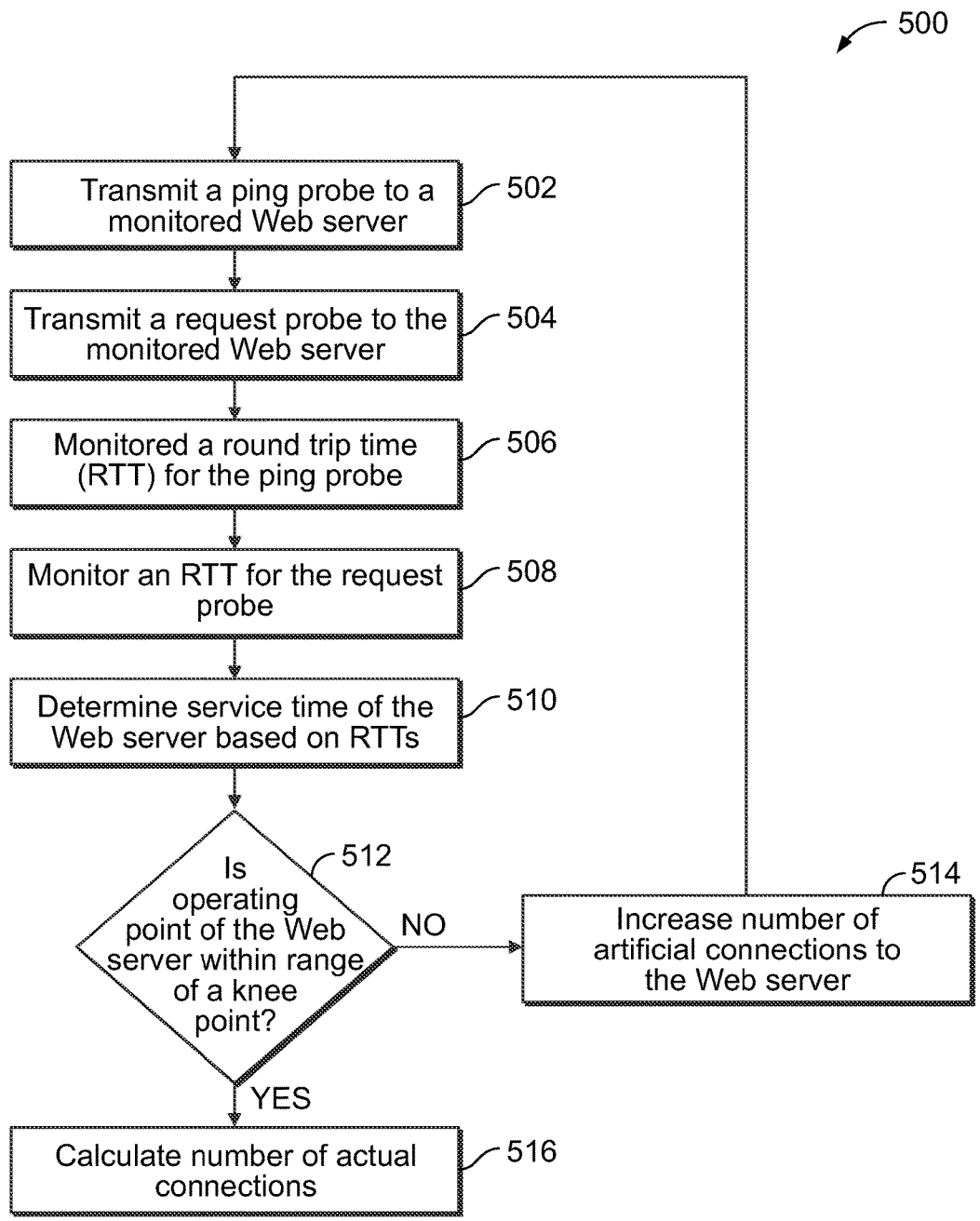
FIG. 5 is a flowchart of one embodiment of a method for estimating a number of active connections and/or actual connections to a server from an endpoint, such as from the probe machine shown in FIG. 1.

FIG. 5 is a flowchart of one embodiment of a method 500 for estimating a number of active connections and/or actual connections to a Web server from an endpoint. The method 500 may be used in conjunction with one or more embodiments of the EWM system 100 (shown in FIG. 1) described above to estimate the number of actual Web clients 110 (shown in FIG. 1) that are connected to a Web server 106 (shown in FIG. 1). As described above, the method 500 may be used to estimate the number of active connections and/or actual connections without requiring administrative access to the server logs of the Web server and/or requiring the Web clients to install third party "crowd sourcing" software. In one embodiment, one or more operations described herein, including those in connection with the method 500, may be performed by a computing device (e.g., computer, processor, controller, or other logic-based device) operating based on one or more sets of instructions (e.g., computer software and/or code) that is stored on a tangible and/or non-transitory computer readable storage medium (e.g., a computer memory). The probe machine 102 and/or artificial connection generators 104 may represent the hardware, computer readable storage medium, and/or the sets of instructions.

At 502, a ping probe (e.g., a TCP ping probe) is transmitted to a monitored Web server over a probing connection with the Web server. As described above, the probe machine 102 (shown in FIG. 1) may transmit one or more ping probes 300, 400 (shown in FIGS. 3 and 4) to the Web server 106 (shown in FIG. 1). The ping probe is returned back to the probe machine 102 from the Web server 106.

At 504, a request probe is transmitted to the monitored Web server. The request probe may be sent over the same probing connection as the ping probe or a different probing connection. As described above, the probe machine 102 (shown in FIG. 1) may transmit one or more request probes 302, 402 (e.g., HTTP HEAD request probes) as shown in FIGS. 3 and 4 to the Web server 106 (shown in FIG. 1). The request probe may be executed or otherwise processed by the Web server 106 and returned to the probe machine 102.

At 506, a round or return trip time (RTT) is monitored for the ping probe. The RTT of the TCP ping probe may represent the time required for the ping probe to be transmitted to the Web server 106 (shown in FIG. 1) and return back to the probe machine 102 (shown in FIG. 1). In one embodiment, the RTT of the ping probe represents network latency of the one or more connections between the probe machine 102 and the Web server 106.

At 508, an RTT is monitored for the request probe. The RTT of the request probe may represent the time required for the request probe to be transmitted to the Web server 106 (shown in FIG. 1), be processed or at least partially executed by the Web server 106, and return back to the probe machine 102 (shown in FIG. 1). In one embodiment, the RTT of the request probe represents both network latency and the service time (along with any queue delays, if applicable) of the Web server 106.

At 510, the service time of the Web server is determined based on the RTTs of the ping probe and the request probe. For example, the network latency represented by the RTT of the ping probe may be subtracted from the RTT of the request probe to determine the service time of the Web server.

At 512, a determination is made as to whether the service times indicate that a current operating point of the Web server is within range of a knee point of the Web server. As described above, if the service times of the Web server do not exhibit delays caused by queuing, such as by not exhibiting accept queue delays, then the service times may not indicate that the Web server is within a predetermined range, such as an error or confidence range, of the knee point of the Web server. Conversely, if the service times indicate that some accept queue delay is included in the service times, then the service times may indicate that the Web server is within range of the knee point. If the operating state of the Web server is not within range of the knee point, then flow of the method 500 continues to 514. On the other hand, if the operating state is within range of the knee point, then flow of the method 500 proceeds to 516.

At 514, the number of artificial connections to the Web server is increased. For example, if the service times indicate that the Web server is in an operating state below the knee point, then the number of artificial connections to the Web server may need to be increased in order to push the Web server to the knee point. As a result, one or more new or additional artificial connections are made to the Web server. The number of artificial connections with the Web server is tracked or monitored. Flow of the method 500 returns to 502, where the RTTs of ping and request probes are again obtained and examined to determine if the Web server is approaching the knee point. The method 500 may continue in a loop wise manner until the number of artificial connections pushes the Web server to the knee point, or within a predetermined range of the knee point.

Alternatively, if, at 512, it is determined that the Web server may be operating in a state above the knee point (e.g., the number of connections to the Web server already exceeds the connection limitation parameter 206 shown in FIG. 2), then flow of the method 500 may proceed to 514, where the number of artificial connections to the Web server is decreased. For example, one or more artificial connections may be terminated or held back from being sent to the Web server.

At 516, the number of actual connections by Web clients to the Web server is calculated, such as by estimating the number of active connections and determining the number of actual connections based on the number of active connections and the number of controlled artificial connections. In one embodiment, the number of actual connections may be estimated by, among other things, subtracting the number of artificial connections from the connection limitation parameter of the Web server. Alternatively, the number of artificial connections may be estimated using another calculation, as described above. Following estimation of the number of actual and/or artificial connections, the artificial connections to the Web server may be terminated.

Figure 6:
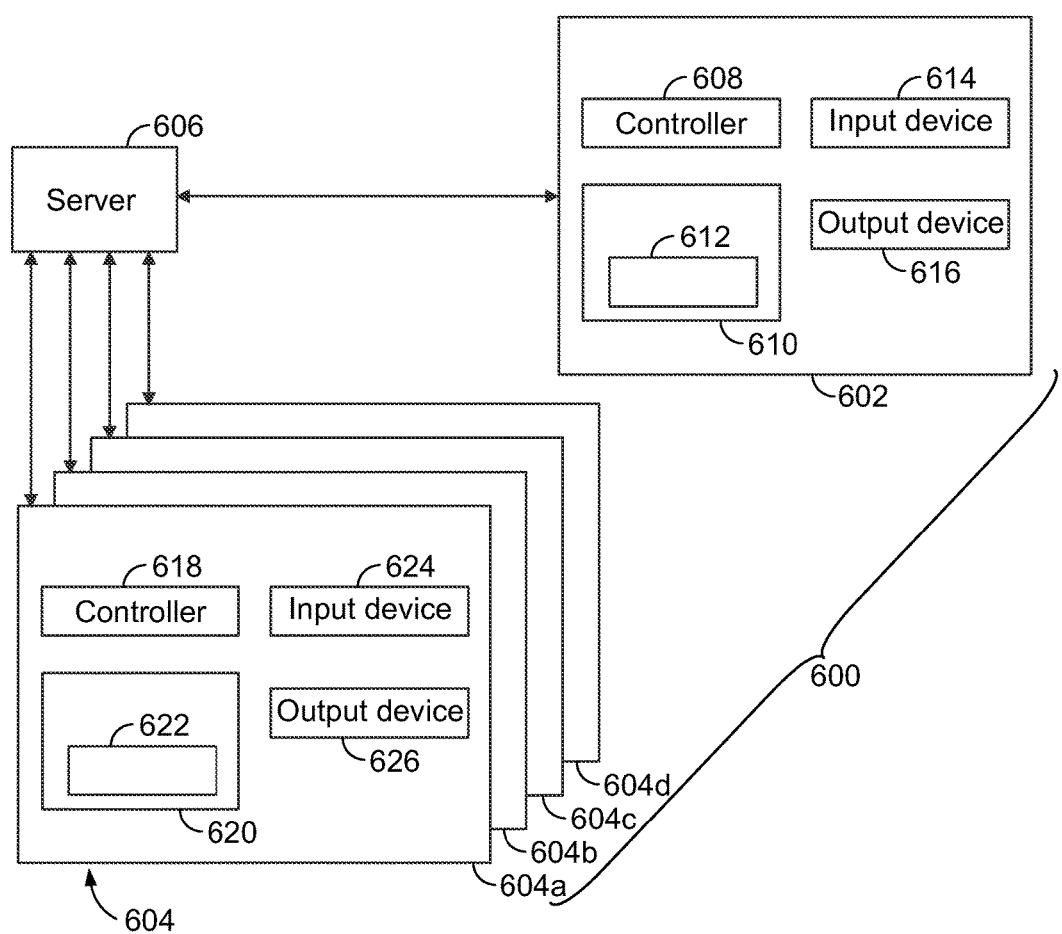
FIG. 6 is a schematic diagram of an Endpoint Web Monitoring system in accordance with another embodiment.

FIG. 6 is a schematic diagram of an Endpoint Web Monitoring system 600 in accordance with another embodiment. The system 600 may be similar to the system 100 shown in FIG. 1. For example, the system 600 may include a probe machine 602 that may be similar to the probe machine 102 shown in FIG. 1 and one or more artificial connection generators 604 that may be similar to the artificial connection generators 104 shown in FIG. 1. The probe machine 602 and the artificial connection generators 604 may communicate with a server 606, such as the server 106 shown in FIG. 1, as described herein. For example, the probe machine 602 may control the number of artificial connections between the artificial connection generators 604 and the server 606 while measuring changes in service times of ping probes and request probes sent to the server 606. The probe machine 602 can derive an estimated connection limitation parameter of the server 606 based on changes in the service times and the associated number of artificial connections. The probe machine 602 can use the estimated connection limitation parameter to determine an actual number of connections between the server 606 and one or more client machines, such as one or more clients 110 (shown in FIG. 1) other than the probe machine 602 and the artificial connection generators 604, as described above. While four artificial connection generators 604*a-d* are shown, alternatively, a different number of artificial connection generators 604 may be used.

The probe machine 602 includes a controller 608 that performs operations of the probe machine 602 based on one or more sets of instructions. The controller 608 may include or represent a computer processor, controller, or other logic-based device. The sets of instructions that direct operations of the controller 608 may be stored on a computer readable storage medium, such as a memory 610. The memory 610 may be a tangible and non-transitory (e.g., not a transient electric signal) medium that is readable and accessible by the controller 608, such as a computer memory. The sets of instructions may be stored on the memory 610 as one or more modules 612, such as software modules, software systems, software applications, and the like.

In the illustrated embodiment, the probe machine 602 includes an input device 614 that receives information from a user of the probe machine 602 and an output device 616 that presents information to the user from the probe machine 602. The input device 614 may include one or more of a keyboard, a microphone, an electronic mouse, a stylus, a touchscreen, and the like. The output device 616 may include one or more of a speaker, an electronic display, the touchscreen (where the input device 614 and the output device 616 may be the same component), a printer, and the like. The input device 614 may receive information from a user, such as previously determined and/or designated connection limitation parameters for the server 606, instructions on when to derive the connection limitation parameter and/or number of connections with the server 606, and the like. The output device 616 may present information to the user such as the estimated connection limitation parameter, the number of connections (e.g., total, actual, artificial, and/or probing connections) with the server 606, and the like.

The artificial connection generators 604 may include controllers 618 that may be similar to the controller 608, memories 620 that may be similar to the memories 610, modules 622 that may be similar to the modules 612, input devices 624 that may be similar to the input device 614, and/or output devices 626 that may be similar to the output device 616.

One or more embodiments of the subject matter described herein provides systems and methods for estimating the number of active connections by Web clients to a Web server in a relatively accurate and/or rapid manner, without requiring administrative access to the Web server or the associated server logs and without requiring the downloading of third party software to the Web clients. The systems and methods may estimate and/or track the number of active connections to a Web server to determine the popularity, changes in popularity, and/or trends in the popularity of one or more services or applications hosted by the Web server.

In another embodiment, an endpoint web monitoring (EWM) system is provided that includes a probe machine and an artificial connection generator. The probe machine is configured to transmit TCP ping probes and request probes to a Web server associated with a connection limitation parameter on a total number of connections with the Web server. The probe machine also is configured to monitor return trip times of the TCP ping probes and of the request probes. The artificial connection generator is configured to create artificial connections with the Web server. The probe machine is configured to monitor the return trip times to determine when a number of active connections and the artificial connections with the Web server approaches the connection limitation parameter. The active connections are representative of connections between Web clients and the Web server. The probe machine is configured to derive the number of active connections based on the number of artificial connections with the Web server.

In another aspect, the probe machine derives the number of active connections without administrative access to the Web server or a server log of the Web server.

In another aspect, the probe machine derives the number of active connections without access to data collected by crowd sourcing applications running on the Web clients.

In another aspect, the connection limitation parameter of the Web server represents the total number of connections that are accepted by the Web server before the Web server introduces queue delays into service times required to execute requests conveyed through the connections.

In another aspect, the probe machine is configured to direct the artificial connection generators to create additional artificial connections with the Web server until the round trip times of the request probes indicate that the service times of the request probes are increased by the queue delays.

In another embodiment, a method of monitoring a popularity of a service or application on a Web server from an endpoint is provided. The method includes transmitting TCP ping probes to the Web server to determine a network latency, transmitting request probes to the Web server to determine a service time of the Web server, changing a number of artificial connections to the Web server based on the service time, and determining a number of actual connections to the Web server based on the number of artificial connections and a connection limitation parameter of the Web server.

In another aspect, transmitting the TCP ping probes includes monitoring round trip times of the TCP ping probes, where the round trip times are representative of the network latency.

In another aspect, transmitting the request probes includes monitoring round trip times of the request probes, where the round trip times are representative of a network latency and the service time.

In another aspect, changing the number of artificial connections includes increasing the number of artificial connections when the service time of the Web server does not include a queue delay.

In another aspect, determining the number of actual connections is performed without administrative access to the Web server or a server log of the Web server.

In another aspect, determining the number of actual connections is performed without access to data collected by crowd sourcing applications running on the Web clients.

In another aspect, the connection limitation parameter of the Web server represents the total number of connections that are accepted by the Web server before the Web server introduces queue delays into the service time.

In another aspect, changing the number of artificial connections includes creating additional artificial connections with the Web server until round trip times of the request probes indicate that the service times of the request probes are increased by the queue delays.

In another embodiment, a computer readable storage medium for an endpoint web monitoring (EWM) system having a processor is provided. The computer readable storage medium includes instructions that direct the processor to transmit TCP ping probes to a Web server to determine a network latency, transmit request probes to the Web server to determine a service time of the Web server, change a number of artificial connections to the Web server based on the service time, and determine a number of actual connections to the Web server based on the number of artificial connections and a connection limitation parameter of the Web server.

In another aspect, the instructions direct the processor to monitor round trip times of the TCP ping probes, where the round trip times are representative of the network latency.

In another aspect, the instructions direct the processor to monitor round trip times of the request probes, where the round trip times are representative of a network latency and the service time.

In another aspect, the instructions direct the processor to increase the number of artificial connections when the service time of the Web server does not include a queue delay.

In another aspect, the instructions direct the processor to determine the number of actual connections is without administrative access to the Web server or a server log of the Web server.

In another aspect, the instructions direct the processor to determine the number of actual connections without access to data collected by crowd sourcing applications running on the Web clients.

In another aspect, the connection limitation parameter of the Web server represents the total number of connections that are accepted by the Web server before the Web server introduces queue delays into the service time.

In another aspect, the instructions direct the processor to create additional artificial connections with the Web server until round trip times of the request probes indicate that the service times of the request probes are increased by the queue delays.

In another embodiment, a system is provided that includes an artificial connection generator and a probe machine. The artificial connection generator is configured to establish one or more artificial connections with a server that at least partially hosts one or more services or applications for access by clients. The probe machine is configured to control a number of artificial connections with the server by the artificial connection generator. The probe machine also is configured to establish a probing connection with a server to determine a service time of the server that is indicative of a time period involved with execution by the server of one or more requests to the server. The probe machine is configured to derive a number of actual connections between the clients and the server based on changes in the service time of the server when the number of artificial connections with the server is varied.

In another aspect, the actual connections represent connections between the server and the clients other than the artificial connection generator and the probe machine.

In another aspect, the server is associated with a connection limitation parameter indicative of a number of requests that are received and executed by the server before placing additional requests into an accept queue before executing the additional requests.

In another aspect, the probe machine is configured to change the number of artificial connections with the server and monitor changes in the service time of the server in order to determine the connection limitation parameter of the server.

In another aspect, the probe machine is configured to increase the number of artificial connections between the artificial connection generator and the server until a round trip time (RTT) of a request sent to the server increases, and the probe machine is configured to derive the number of actual connections based on the number of artificial connections associated with the increase in the RTT of the request.

In another aspect, the artificial connection generator is configured to establish the one or more artificial connections by communicating at least one of an open-ended request or an incomplete request for information to the server.

In another aspect, the probe machine is configured to establish the probing connection by communicating one or more ping probes and at least one request for information to the server.

In another aspect, the probe machine is configured to derive the number of actual connections based on a number of the artificial connections with the server that increases the service time of the server, a number of the artificial connections with the server that does not increase the service time of the server, and a connection limitation parameter that is indicative of a number of requests that are received and executed by the server before placing additional requests into an accept queue before executing the additional requests.

In another aspect, the number of actual connections is restricted information of the server and the probe machine is configured to derive the number of actual connections without having access to the restricted information.

In another embodiment, a method is provided that includes measuring services times for executing requests sent to a server, controlling a number of artificial connections with the server based on the service times, monitoring changes in the service times of the server based on changes in the number of artificial connections with the server, and deriving a number of actual connections with the server based on the changes in the service times. The actual connections represent connections with the server other than connections used to measure the service times or to establish the artificial connections with the server.

In another aspect, the server is associated with a connection limitation parameter indicative of a number of requests that are received and executed by the server before placing additional requests into an accept queue before executing the additional requests.

In another aspect, the method also includes determining the connection limitation parameter of the server based on the changes in the service times.

In another aspect, controlling the number of artificial connections includes increasing the number of artificial connections with the server until round trip times (RTT) of the requests sent to the server increase, and the number of actual connections is derived based on the number of artificial connections associated with the increase in the RTT.

In another aspect, controlling the number of artificial connections includes directing one or more artificial connection generators to communicate at least one of an open-ended request or an incomplete request for information to the server.

In another aspect, measuring the service times includes communicating one or more ping probes and at least one request for information to the server.

In another aspect, the number of actual connections is derived based on a number of the artificial connections with the server that increases the service times of the server, a number of the artificial connections with the server that does not increase the service times of the server, and a connection limitation parameter that is indicative of a number of requests that are received and executed by the server before placing additional requests into an accept queue before executing the additional requests.

In another aspect, the number of actual connections is restricted information of the server and deriving the number of actual connections is performed without having access to the restricted information.

In another embodiment, a computer readable storage medium for a system having a controller is provided. The computer readable storage medium includes one or more sets of instructions that are configured to direct the controller to measure services times for executing requests sent to a server, control a number of artificial connections with the server based on the service times, monitor changes in the service times of the server based on changes in the number of artificial connections with the server, and derive a number of actual connections with the server based on the changes in the service times. The actual connections represent connections with the server other than connections used to measure the service times or to establish the artificial connections with the server.

In another aspect, the computer readable storage medium is a tangible and non-transitory computer readable storage medium.

In another aspect, the server is associated with a connection limitation parameter indicative of a number of requests that are received and executed by the server before placing additional requests into an accept queue before executing the additional requests. The one or more sets of instructions also are configured to direct the controller to determine the connection limitation parameter of the server based on the changes in the service times.

In another aspect, the one or more sets of instructions are configured to direct the controller to increase the number of artificial connections with the server until round trip times (RTT) of the requests sent to the server increase, and to derive the number of actual connections based on the number of artificial connections associated with the increase in the RTT.

In another aspect, the one or more sets of instructions are configured to direct the controller to direct one or more artificial connection generators to communicate at least one of an open-ended request or an incomplete request for information to the server.

In another aspect, the one or more sets of instructions are configured to direct the controller to measure the service times includes communicating one or more ping probes and at least one request for information to the server.

In another aspect, the one or more sets of instructions are configured to direct the controller to derive the number of actual connections based on a number of the artificial connections with the server that increases the service times of the server, a number of the artificial connections with the server that does not increase the service times of the server, and a connection limitation parameter that is indicative of a number of requests that are received and executed by the server before placing additional requests into an accept queue before executing the additional requests.

In another aspect, the number of actual connections is restricted information of the server and the one or more sets of instructions are configured to direct the controller to derive the number of actual connections without having access to the restricted information.

At least one technical effect of the subject matter described herein provides a system and method that allows for the independent verification of popularity claims by various web-based advertising locations prior to paying to have advertisements posted on the locations. For example, when a person seeking to advertise on one or more websites, the systems and methods provided herein can provide the person with popularity metrics indicative of which websites are more popular with Internet users, independent of the popularity claims made by the websites. The person may then compare the popularity metrics with the popularity claims of the websites to verify the claims and/or decide which website the person should pay to display the advertisements. Such a system and method can be a more efficient and independent manner of ensuring that an advertiser is not paying more for advertising on less popular websites.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the inventive subject matter, including the best mode, and also to enable any person of ordinary skill in the art to practice the embodiments disclosed herein, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the disclosed subject matter will be better understood when read in conjunction with the appended drawings. To the extent that the figures illustrate diagrams of the functional blocks of various embodiments, the functional blocks are not necessarily indicative of the division between hardware circuitry.

Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
   an artificial connection generator configured to establish one or more artificial connections with a server that at least partially hosts one or more services or applications for access by clients, where the artificial connections differ from actual connections sent by the clients to the server; and
   a probe machine connected with the artificial connection generator, the probe machine configured to generate an artificial connection to the server and control a number of artificial connections with the server by sending control signals to the artificial connection generator, the probe machine also configured to determine a service time of the server that is indicative of a time period involved with execution by the server of one or more requests to the server, and the probe machine varying the number of artificial connections to examine changes in service times based on the number of artificial connections;
   wherein the probe machine is configured to determine a difference between the number of artificial connections and a connection limitation parameter, and to derive a number of the actual connections between the clients and the server based on the difference and changes in the service time of the server when the number of artificial connections with the server is varied, where the derived number of the actual connections provides a popularity or traffic metric for the server, services or applications without having administrative access or privileges to the server or logs of the server.

2. The system of claim 1, wherein the actual connections represent connections between the server and the clients other than the artificial connection generator and the probe machine.

3. The system of claim 1, wherein the server is associated with the connection limitation parameter indicative of a number of requests that are received and executed by the server before placing additional requests into an accept queue before executing the additional requests.

4. The system of claim 3, wherein the probe machine is configured to change the number of artificial connections with the server and monitor changes in the service time of the server in order to determine the connection limitation parameter of the server.

5. The system of claim 1, wherein the probe machine is configured to increase the number of artificial connections between the artificial connection generator and the server until a round trip time (RTT) of a request sent to the server increases, and the probe machine is configured to derive the number of actual connections based on the number of artificial connections associated with the increase in the RTT of the request.

6. The system of claim 1, wherein the artificial connection generator is configured to establish the one or more artificial connections by communicating at least one of an open-ended request or an incomplete request for information to the server.

7. The system of claim 1, wherein the probe machine is configured to establish the probing connection by communicating one or more ping probes and at least one request for information to the server.

8. The system of claim 1, wherein the probe machine is configured to derive the number of actual connections based on a number of the artificial connections with the server that increases the service time of the server, a number of the artificial connections with the server that does not increase the service time of the server, and the connection limitation parameter that is indicative of a number of requests that are received and executed by the server before placing additional requests into an accept queue before executing the additional requests.

9. The system of claim 1, wherein the number of actual connections is restricted information of the server and the probe machine is configured to derive the number of actual connections without having access to the restricted information.

10. A method comprising:
    measuring services times for executing requests sent to a server;
    generating an artificial connection by a probe machine to the server;
    controlling a number of artificial connections with the server based on control signals transmitted by the probe machine, where the artificial connections differ from actual connections sent by the clients to the server;
    varying the number of artificial connections to examine changes in service times based on the number of artificial connections;
    monitoring changes in the service times of the server based on changes in the number of artificial connections with the server;
    determining a difference between the number of artificial connections and a connection limitation parameter; and
    deriving a number of actual connections with the server based on the determined difference and changes in the service times of the server when the number of artificial connections with the server is varied, where the derived number of the actual connections provides a popularity or traffic metric for the service, a service or an application without having administrative access or privileges to the server or logs of the server.

11. The method of claim 10, wherein the server is associated with the connection limitation parameter indicative of a number of requests that are received and executed by the server before placing additional requests into an accept queue before executing the additional requests.

12. The method of claim 11, further comprising determining the connection limitation parameter of the server based on the changes in the service times.

13. The method of claim 10, wherein controlling the number of artificial connections includes increasing the number of artificial connections with the server until round trip times (RTT) of the requests sent to the server increase, and the number of actual connections is derived based on the number of artificial connections associated with the increase in the RTT.

14. The method of claim 10, wherein controlling the number of artificial connections includes directing one or more artificial connection generators to communicate at least one of an open-ended request or an incomplete request for information to the server.

15. The method of claim 10, wherein measuring the service times includes communicating one or more ping probes and at least one request for information to the server.

16. The method of claim 10, wherein the number of actual connections is derived based on a number of the artificial connections with the server that increases the service times of the server, a number of the artificial connections with the server that does not increase the service times of the server, and the connection limitation parameter that is indicative of a number of requests that are received and executed by the server before placing additional requests into an accept queue before executing the additional requests.

17. The method of claim 10, wherein the number of actual connections is restricted information of the server and deriving the number of actual connections is performed without having access to the restricted information.

18. A computer readable storage medium for a system having a controller, the computer readable storage medium including one or more sets of instructions that are configured to direct the controller to:
measure services times for executing requests sent to a server;
generate an artificial connection by a probe machine to the server;
control a number of artificial connections with the server based on control signals transmitted by a probe machine, where the artificial connections differ from actual connections sent by the clients to the server;
vary the number of artificial connections to examine changes in service times based on the number of artificial connections;
monitor changes in the service times of the server based on changes in the number of artificial connections with the server;
determine a difference between the number of artificial connections and a connection limitation parameter; and
derive a number of actual connections with the server based on the determined difference and changes in the service times of the server when the number of artificial connections with the server is varied, where the derived number of the actual connections provides a popularity or traffic metric for the server, a service or an application without having administrative access or privileges to the server or logs of the server.

19. The computer readable storage medium of claim 18, wherein the server is associated with the connection limitation parameter indicative of a number of requests that are received and executed by the server before placing additional requests into an accept queue before executing the additional requests, and the one or more sets of instructions are configured to direct the controller to determine the connection limitation parameter of the server based on the changes in the service times.

20. The computer readable storage medium of claim 18, wherein the one or more sets of instructions are configured to increase the number of artificial connections with the server until round trip times (RTT) of the requests sent to the server increase, and to derive the number of actual connections based on the number of artificial connections associated with the increase in the RTT.

21. The computer readable storage medium of claim 18, wherein the one or more sets of instructions are configured to direct the controller to direct one or more artificial connection generators to communicate at least one of an open-ended request or an incomplete request for information to the server.

22. The computer readable storage medium of claim 18, wherein the one or more sets of instructions are configured to direct the controller to measure the service times includes communicating one or more ping probes and at least one request for information to the server.

23. The computer readable storage medium of claim 18, wherein the one or more sets of instructions are configured to direct the controller to derive the number of actual connections based on a number of the artificial connections with the server that increases the service times of the server, a number of the artificial connections with the server that does not increase the service times of the server, and the connection limitation parameter that is indicative of a number of requests that are received and executed by the server before placing additional requests into an accept queue before executing the additional requests.

24. The computer readable storage medium of claim 18, wherein the number of actual connections is restricted information of the server and the one or more sets of instructions are configured to direct the controller to derive the number of actual connections without having access to the restricted information.

* * * * *